(12) United States Patent
Mansikkamäki

(10) Patent No.: US 11,012,140 B2
(45) Date of Patent: May 18, 2021

(54) DEVICE AND METHOD FOR RECEIVING AND RERADIATING ELECTROMAGNETIC SIGNALS

(71) Applicant: StealthCase Oy, Tampere (FI)

(72) Inventor: Janne Mansikkamäki, Tampere (FI)

(73) Assignee: StealthCase Oy, Tampere (FI)

( * ) Notice: Subject to any disclaimer, the term of this patent is extended or adjusted under 35 U.S.C. 154(b) by 229 days.

(21) Appl. No.: 16/072,920

(22) PCT Filed: Dec. 16, 2016

(86) PCT No.: PCT/FI2016/050893
§ 371 (c)(1),
(2) Date: Jul. 26, 2018

(87) PCT Pub. No.: WO2017/129855
PCT Pub. Date: Aug. 3, 2017

(65) Prior Publication Data
US 2019/0044606 A1  Feb. 7, 2019

(30) Foreign Application Priority Data
Jan. 27, 2016 (FI) ..................... 20165050

(51) Int. Cl.
*H04B 7/145* (2006.01)
*H01Q 15/00* (2006.01)
(Continued)

(52) U.S. Cl.
CPC ......... *H04B 7/145* (2013.01); *H01Q 15/0013* (2013.01); *H04B 7/15507* (2013.01);
(Continued)

(58) Field of Classification Search
CPC ........ G10K 11/172; H02J 7/025; H02J 50/12; H02J 50/50; H02J 50/20; H02J 50/10;
(Continued)

(56) References Cited

U.S. PATENT DOCUMENTS 6,563,425 B2 * 5/2003 Nicholson ............ G06K 7/0008
340/572.7
6,653,980 B2 * 11/2003 Ceccom ................. H01Q 1/287
343/705
(Continued)

FOREIGN PATENT DOCUMENTS

FI           10682 U1    11/2014
FI          126944 B      8/2017
(Continued)

OTHER PUBLICATIONS

International Search Report, Application No. PCT/FI2016/050893, dated Jul. 4, 2017, 4 pages.
(Continued)

*Primary Examiner* — Olumide Ajibade Akonai
(74) *Attorney, Agent, or Firm* — Ziegler IP Law Group, LLC

(57) ABSTRACT

A device for receiving and re-radiating electromagnetic signals. The device is configured to be attached with a construction supply. The device includes an electromagnetically floating group of resonating sections to form a propagation path to guide electromagnetic energy of the electromagnetic signals from one side of the construction supply to another side of the construction supply. The electromagnetically floating group of resonating sections includes at least a first resonating section and a second resonating section positioned in a near field of the adjacent, first resonating section in the direction of the propagation path. The disclosed embodiments also relates to a method for receiving and re-radiating electromagnetic signals by a device attached with a construction supply.

25 Claims, 16 Drawing Sheets

(51) Int. Cl.
  *H04B 7/155* (2006.01)
  *H04B 7/26* (2006.01)
  *H02J 50/12* (2016.01)
  *H02J 50/50* (2016.01)
  *H01Q 13/10* (2006.01)

(52) U.S. Cl.
  CPC ....... H04B 7/15514 (2013.01); H04B 7/2606 (2013.01); *H01Q 13/10* (2013.01); *H02J 50/12* (2016.02); *H02J 50/50* (2016.02)

(58) Field of Classification Search
  CPC ...... H01P 7/04; H01P 7/06; H01P 7/10; H01P 1/2084; H01P 7/065; H01P 7/08; H01P 7/00; H04B 7/145; H04B 7/15507; H04B 7/15514; H04B 7/2606; H04B 5/0075; H01Q 21/06; H01Q 13/10; H01Q 5/10; H01Q 9/0485; H01Q 19/132; H01Q 23/00; H01Q 15/0013; H01Q 25/00; H01Q 7/00; H01Q 15/14; H01Q 1/243; H04W 16/26; H04W 16/20; H04W 88/085; E06B 2009/6818; Y02D 30/70; Y02B 80/00; Y02A 30/24; Y02A 90/10; H03F 19/00; H03F 38/14
  See application file for complete search history.

(56) References Cited

U.S. PATENT DOCUMENTS

| | | | |
|---|---|---|---|
| 7,268,736 B1 | 9/2007 | Tikhov et al. | |
| 7,924,751 B2 | 4/2011 | Dean | |
| 8,121,540 B1 | 2/2012 | Johnson et al. | |
| 8,462,062 B2* | 6/2013 | Westrick | G06K 19/0723 343/731 |
| 8,634,764 B2* | 1/2014 | Cruz | H01C 21/007 455/7 |
| 2002/0028655 A1* | 3/2002 | Rosener | H04W 16/26 455/16 |
| 2002/0140611 A1 | 10/2002 | Ligander et al. | |
| 2007/0001809 A1* | 1/2007 | Kodukula | G06K 7/10346 340/10.1 |
| 2007/0205946 A1 | 9/2007 | Buris et al. | |
| 2008/0267112 A1 | 10/2008 | Lucidarme | |
| 2012/0098628 A1 | 4/2012 | Batchelor et al. | |
| 2012/0112531 A1* | 5/2012 | Kesler | H02J 50/60 307/9.1 |
| 2012/0235504 A1* | 9/2012 | Kesler | H02J 50/90 307/104 |
| 2013/0035090 A1 | 2/2013 | Moshfeghi | |
| 2013/0255755 A1* | 10/2013 | Chich | H02S 20/25 136/251 |
| 2014/0021798 A1* | 1/2014 | Kesler | H02J 50/60 307/104 |
| 2014/0198008 A1 | 7/2014 | Walker | |
| 2014/0265617 A1* | 9/2014 | Roy | H02J 7/025 307/104 |
| 2014/0265621 A1* | 9/2014 | Wong | H02J 50/30 307/104 |
| 2014/0313091 A1 | 10/2014 | Lee | |
| 2014/0364057 A1 | 12/2014 | Schumann et al. | |
| 2015/0130407 A1* | 5/2015 | Ni | H02J 50/50 320/108 |
| 2016/0013547 A1* | 1/2016 | Tishin | H01Q 7/00 343/873 |
| 2016/0308403 A1* | 10/2016 | Bluvshtein | H02J 50/12 |

FOREIGN PATENT DOCUMENTS

| | | |
|---|---|---|
| JP | 2003069282 A | 3/2003 |
| JP | 2010159564 A | 7/2010 |
| RU | 2300839 C2 | 6/2007 |
| WO | 0124407 A1 | 4/2001 |
| WO | 2013121103 A1 | 8/2013 |
| WO | 2016027007 A1 | 2/2016 |

OTHER PUBLICATIONS

Extended European Search Report received for European Patent Application No. EP16887813.0, dated Aug. 6, 2019, 11 pages.

The Federal Service for Intellectual Property, Patents and Trademarks, Decision on Granting, Application No. 2018127880/28(044531), dated Jun. 2, 2020, 15 Pages.

* cited by examiner

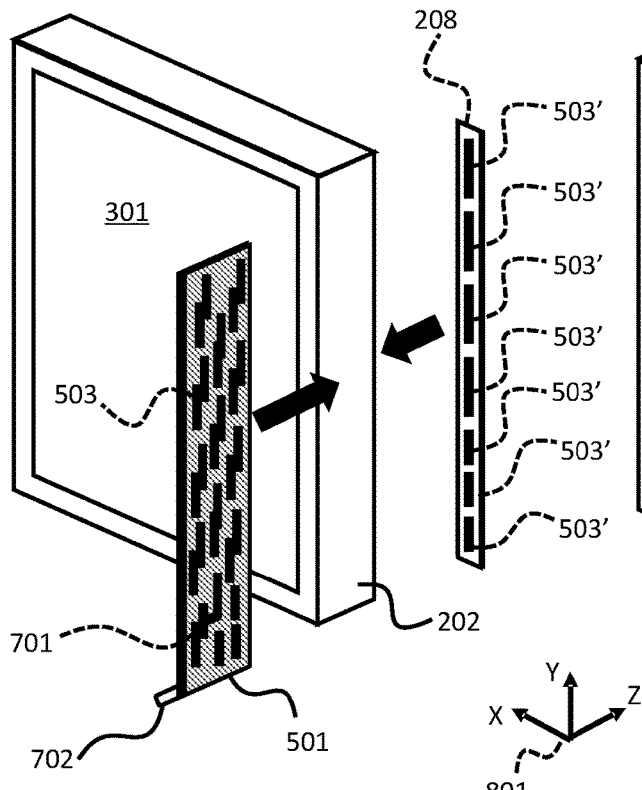
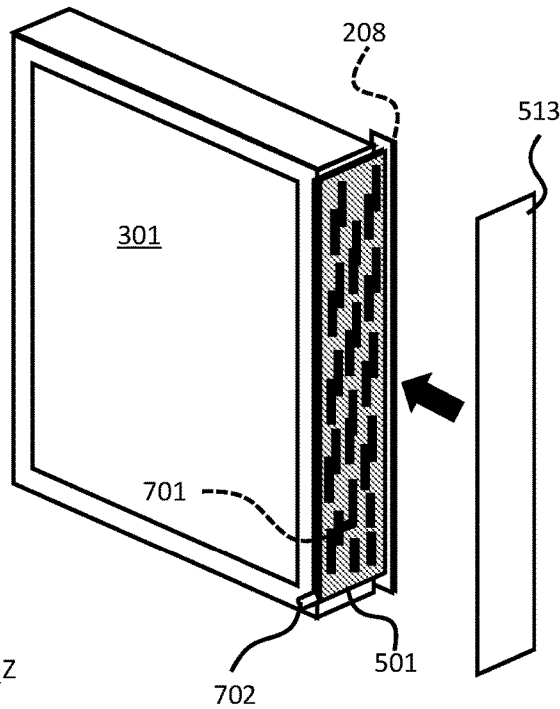
Fig. 15a    Fig. 15b
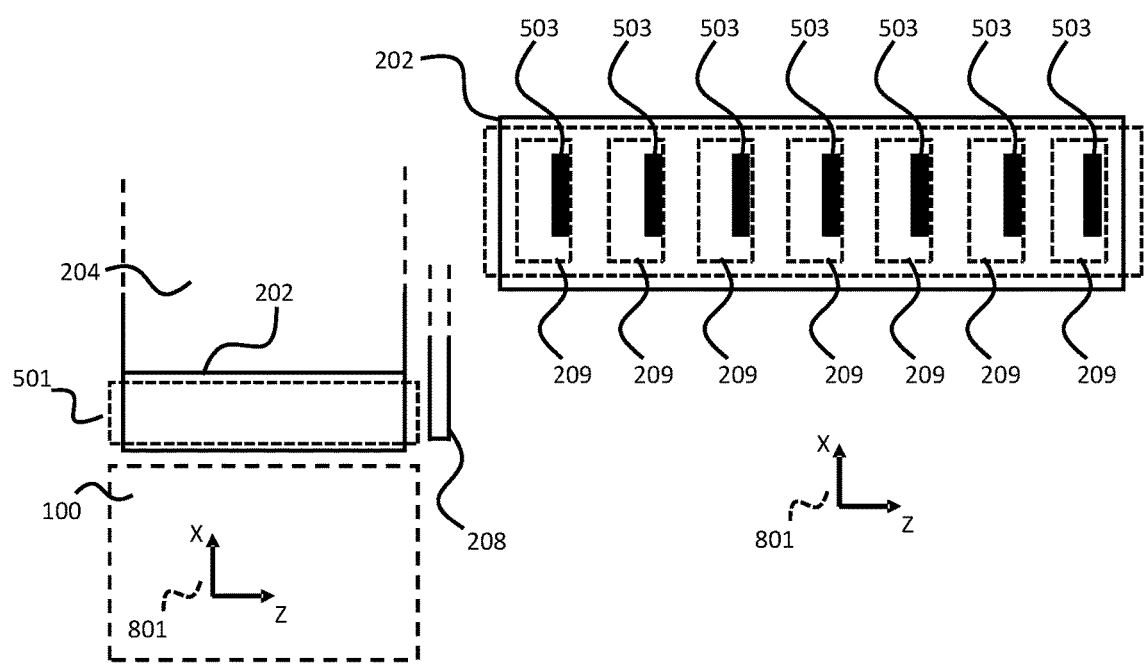
Fig. 16a    Fig. 16b

DEVICE AND METHOD FOR RECEIVING AND RERADIATING ELECTROMAGNETIC SIGNALS

FIELD

The aspects of the disclosed embodiments relate to a device for receiving and re-radiating electromagnetic signals through energy efficient window or wall structures. The aspects of the disclosed embodiments also relate to a method for receiving and re-radiating electromagnetic signals.

BACKGROUND

Aims of the construction industry to build passive and zero energy buildings are leading to a situation in which efficient thermal insulation strongly attenuates the signals of mobile phones and other wireless systems, wherein it may be even impossible to use a mobile phone inside a building. There are many reasons for the attenuation, but one reason that has been detected is the use of so called selective glass panes, that is, windows laminated with a conductive coating.

Energy efficient construction trend aims to reduce heating energy loss from buildings. Depending on the geographic area, energy efficiency concentrates either on keeping the buildings warm at wintertime, or maintaining the cooled air temperature in warmer regions. In each case, control of warm and cold air flow is of interest. This energy efficient construction trend is leading to situations, where electromagnetic signals cannot penetrate inside buildings without significant attenuation. Mobile phones, tablets, Internet of Things (IoT) sensors, and many other wireless devices rely on cellular connection, and increased signal attenuation may reduce the usability and data rates of such devices.

It may not only be signals of mobile communication networks which should not be attenuated too strongly but also signals of other wireless networks as well may be utilized in communication between inside and outside of a building. For example, different kinds of WLAN-based communication applications such as Voice over WLAN may increase popularity in the future. Thus, reducing signal attenuation may become more and more important issue when designing and constructing buildings.

Buildings made of reinforced concrete may also have quite a strong attenuation of electromagnetic signals due to reinforcing steel nets and/or bars wherein signal strength may be quite heavily attenuated inside the building.

One reason for signal attenuation is the use of so called selective glass panes, that is, windows laminated with an electrically conductive coatings (Low-E) to improve energy effectiveness. Conventionally, signals of wireless systems can enter buildings through windows, but the conductive coatings may cause an attenuation of even tens of decibels, depending on the frequency range. In addition to the windows, electromagnetic signals have previously been capable of passing through walls of buildings, but aluminium coated thermal insulation boards which are commonly used in walls today, efficiently prevent the propagation of signals into the buildings. Electromagnetic signals may also be attenuated by concrete material and reinforce-ments in concrete structures, whereby when passing through such a structure, the signal strength may be reduced too much to be sufficient for the use of e.g. a mobile phone on the other side of the wall.

Energy saving windows utilize glazing that attenuates electromagnetic signal penetration through the window. This creates challenges to operate mobile devices such as mobile phones or tablets inside modern buildings without sacrificing wireless data rates. Signal attenuation may be e.g. in the range from 20 to 40 decibels, which can cause significant reductions in practical data rates of mobile devices, such as mobile phones, tablets, or IoT sensors.

Energy efficient windows is not the only field of application where electromagnetic signal penetration inside the building is heavily attenuated. So called smart windows or smart glasses may comprise features such as solar panels or electrochromic surfaces. Solar panels can be used to provide electrical energy, which can be stored, used by an apparatus, or it can also be fed back to the electric power network. The behaviour of an electrochromic glass, on the other hand, can be modified with an electrical, light, or heat control. Such glass can be, for example, dimmed or made fully transparent, or it can be made to change colour. Both solar panels and electrochromic glasses have conductor or semiconductor layers, which further reduce the penetration of electromagnetic signals through such windows.

Attempts have been made to solve this problem by means of, for example, a passive antenna system that comprises two separate antennas and a transfer line connecting these two antennas. However, such transmission line creates a cold bridge through the wall. Cold bridges, or thermal bridges reduce the energy efficiency of walls, but most importantly, these may also promote moisture condensation inside walls, and therefore lead to moisture and mildew problems. A cold bridge is formed in a wall structure when the thermal conductivity of a medium considerably differs from the thermal conductivity of its surroundings. A nail penetrating through a rigid polyurethane insulation board is an example of a cold bridge.

Other attempts include removing parts of the selective glass surfaces to enable electromagnetic signal penetration. These methods, however, reduce the thermal insulation properties of the windows as well as create visually observable defects in the light reflection properties on the surface of the glass. In other words, the glass surface comprises scratches that are visually observable. Moreover, such solutions are prone to performance degradation when metallic window blinds are used. Document WO2013/121103 A1 presents the state of the art in this field. In this approach, areas of the selective surfaces are left uncoated from each selective glass.

BRIEF SUMMARY

It is an aim of the aspects of the disclosed embodiments to improve the state of the art and to provide a device for a construction supply with enhanced properties for transferring electromagnetic signals between separated spaces on both sides of a building wall or window structure. The aim is to provide a propagation tunnel for electromagnetic energy, directly penetrating through the wall and window structures. The aspects of the disclosed embodiments may provide improved signal-to-noise ratios for wireless radio appliances operating inside buildings, and promotes increased data rates compared to situations without the aspects of the disclosed embodiments without a need for external power supply or maintenance. In accordance with an embodiment, the device comprises at least an electrically floating group of resonant re-radiating sections. In the present solution according to the invention, there need not be two separate antennas, and the received signal is not transmitted to a receiver or another antenna along a transfer line but transferred by means of a group of radiators and/or reflectors. Furthermore, the structure of the device is such that cold bridges should not be formed by the resonating sections.

To put it more precisely, the device according to the aspects of the disclosed embodiments is primarily characterized in that the device comprises an electromagnetically floating group of resonating sections to form a propagation path to guide electromagnetic energy of the electromagnetic signals from one side of the construction supply to another side of the construction supply; wherein the electromagnetically floating group of resonating sections comprises at least a first resonating section and a second resonating section positioned in a near field of the adjacent, first resonating section in the direction of the propagation path. The method according to the present invention is primarily characterized in that the method comprises receiving electromagnetic signals by an electromagnetically floating group of resonating sections forming a propagation path; using the electromagnetically floating group of resonating sections to guide electromagnetic energy of the electromagnetic signals from one side of the construction supply to another side of the construction supply; wherein electromagnetic energy is transferred by a first resonating section to a second resonating section positioned in a near field of the adjacent, first resonating section in the direction of the propagation path.

Some advantageous embodiments of the present disclosure are presented in the dependent claims.

In accordance with an embodiment, the device is a passive electromagnetic repeater system within a construction supply, integrated to a window, window frame, or to the wall structure. A group of floating resonant resonating sections are assembled with the construction supply to guide electromagnetic energy through the attenuating medium.

The present disclosure shows some advantages over the solutions of prior art. In the present solution according to the aspects of the disclosed embodiments, the device does not introduce any cold bridges or visually observable defects in glass surface nor building walls. Moreover, the aspects of the disclosed embodiments are not affected by the presence of metallic windows blinds. Compared to a conventional energy saving windows having a selective glass surface, the device according to an embodiment of the present disclosure may increase the penetration of electromagnetic signals from 10 dB up to 30 dB through the window aperture.

The device according to the aspects of the disclosed embodiments can be used to enhance the propagation of some electromagnetic signals through a structure that significantly attenuates such signals, whereby reception of these electromagnetic signals can be achieved even in spaces where the electromagnetic signals could not be received otherwise. Furthermore, the device according to the aspects of the disclosed embodiments can be used to improve the reception of signals in other types of shadow areas as well. By its principle of operation, the device according to the aspects of the disclosed embodiments is a passive device, so that there is no need for an external energy source or active signal amplifiers. Moreover, it is not necessary to connect a feeder cable to the device, which also simplifies the structure and use of the device. Because no feeder cable is needed, there will not be any junction losses either which occur between the feeder cable and the antenna in the solutions of prior art.

By means of the device according to the aspects of the disclosed embodiments, an electromagnetic signal can thus be brought to shadow areas in which the field strength has been otherwise damped. The device can be used to guide an electromagnetic wave in a desired direction depending on, for example, the design and the structure of the device.

Smaller RF losses achieved by the device, resulting from e.g. the fact that there is no need for a cable, give a better efficiency and thereby a larger reception area than a system implemented with a cable.

The structure of the device according to the aspects of the disclosed embodiments is simpler compared with a conventional passive antenna repeater system. Moreover, the structure can be hidden inside the wall of a building, whereby it is not visually unaesthetic in the same way as conventional large rake antennas. Several structures can be embedded in the wall, whereby their combined action is pronounced and the effective area is increased. There is no need for a transition point between the antenna and the transfer line in the structure, which brings significant savings in the manufacturing costs.

DESCRIPTION OF THE DRAWINGS

In the following, the aspects of the disclosed embodiments will be described in more detail with reference to the appended drawings, in which

FIGS. 15a and 15b illustrate an example of how to integrate the passive repeater configuration with a window assembly;

FIGS. 16a and 16b illustrate an example of how to integrate the passive repeater configuration with a window assembly;

DETAILED DESCRIPTION

Figure 1:
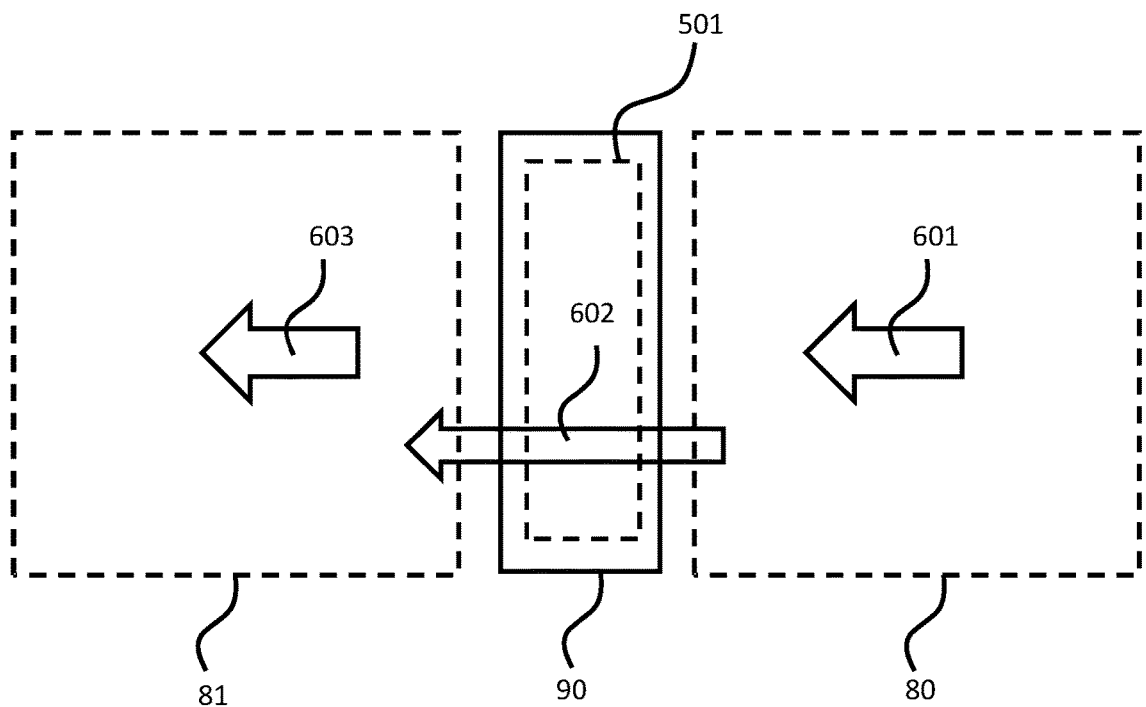
FIG. 1 shows an abstraction of a device of the present disclosure, in accordance with an embodiment.

According to a first functionality of aspects of the disclosed embodiments, a device 501 may operate as a passive repeater comprising an electrically floating group of resonating sections. Hence, the device 501 may also be called as a passive repeater configuration in this specification. The resonating sections are configured in an assembly in order to increase the effectiveness of the signal penetration through or beside a construction supply, such as an energy saving window. The group of resonating sections are configured in an assembly, where each element is positioned in the electromagnetic near field of the adjacent elements. It should be noted here that the resonating sections need not be galvanically separated from each other but may be formed so that by one, appropriately designed re-radiating element comprises two or more resonating sections. A device 501 may then comprise one or more such re-radiating elements.

Window frames can be fabricated using materials such as wood, aluminium, plastic, fiberglass, or other composite materials. The material of the outer frames of windows are often made using aluminium. The structure of the present invention can be integrated with the part of the side jamb, which may be fabricated of a non-metallic material and it can also be integrated directly to the wall part holding the window structure, being thus an independent module that is not attached to the window. In order to improve the effectiveness of the present invention, the outer aluminium part of the window frame may be replaced by a non-metallic material. A commonly used plastic material in window frames is polyvinyl chloride (PVC), which may also be called as vinyl. Unplasticized PVC (uPVC) is favoured in window frames due to its rigidity.

In order to further improve the effectiveness of the radiating elements to receive electromagnetic signals from cellular base stations, the first radiating element can be integrated directly to the outer frame part which is made of plastic, fiberglass, or similar electrically non-conductive material. This may remove or attenuate the shadowing effect which is otherwise caused by the aluminium parts of the outer frames. In order to guide electromagnetic signals to the interior spaces of buildings, it is not required that all aluminium parts are replaced by plastic frames. One favourable, but not limiting use case is to fabricate non-metallic frame parts that hold the passive repeater configuration, and which can be attached to window frames directly at the window manufacturing sites. Another feasible form of implementation is to utilize metal parts which are inserted inside the plastic frame part to provide physical strength for the frame.

In some buildings, the window is embedded in a cavity in a wall, such that the wall parts on each side of the window extend relatively far beyond the window structure. The window frames can therefore locate tens of centimetres away from the outer surface of the wall. This shadowing may cut about half of the horizon that each vertical window frame can see, and from which they can effectively receive base station signals. In order to improve signal reception in such cases, an extended part of the passive repeater configuration can be integrated with the sides of walls next to the window frames.

The passive repeater configuration comprises an electrically floating group of resonating sections. Each of the resonating sections may be configured to operate either at single frequency range, or these can be configured to operate at several frequency bands simultaneously. Furthermore, the passive repeater configuration may comprise groups of resonating sections, in which a first group of resonating sections is configured to operate at a first frequency range, and a second group of resonating sections is configured to operate at a second frequency range.

The simplest physical form of a resonating resonating section is a strip of electrically conductive material, such as aluminium. A strip has a first resonant frequency at the frequency where the length of the strip equals half of a wavelength. Higher resonances of the strip occur at multiples of the first resonance frequency. In order to provide more resonance frequencies to cover multiple cellular frequency bands, or to provide extended bandwidth, the shape of the resonant resonating section can be modified accordingly. One method to create additional resonance frequencies is to incorporate holes, slots, and gaps to the metallic strip. Such physical details can be formed to the outer edges of the strip, or as holes that are not in connection with the outer edges of the metallic strip. A second method to create additional resonances is to form the shape of the metal strip to include bends. The groups can also comprise pairs of resonant elements having unequal lengths to provide parallel resonances of separate metallic strips. Furthermore, the resonant elements may also have shapes of circles, triangles, or squares.

Another functionality of the device of the present invention is to act as an external antenna for radio receivers. In such an embodiment a part of the construction supply is configured to receive electromagnetic signals from external transmitters such as base stations, and to provide an amplified signal level that can be utilized by wireless radio appliances inside the building.

In the following, a more detailed technical introduction of different embodiment examples are provided. For clarity, in some of the figures x-, y- and/or z-coordinate axes 801 are also shown so that they can be referred to when orientations of different elements will be discussed. Generally, if not otherwise indicated, electromagnetic waves propagate at the Z-coordinate plane, a wall is in the XY-plane, electromagnetic energy is transferred through or beside a construction supply such as a wall and/or a window in YZ-plane. In accordance with an embodiment, on one hand the device 501 may form as narrow aperture in the XY-plane as possible and on the other hand the device 501 is configured so that placements of resonating sections 503 in X-plane is narrow whereas there may be more elements in Y-plane to obtain amplification.

It should also be noted that in the following description terms vertical/vertically and horizontal/horizontally are used to illustrate some possible installation alternatives to the device. However, they are only non-limiting example and the device may also be installed in a position which is not vertical or horizontal but also a direction between vertical and horizontal. For example, if a window is not a rectangular but has a different form such as triangular, the window frame is also triangular. Hence, the device may be installed on a section of the window frame which is inclined with respect to the horizontal direction.

FIG. 1 shows an abstraction of a device 501 of the aspects of the disclosed embodiments, in accordance with an embodiment.

According to an embodiment of the present disclosure, the device has a functionality in which a passive repeater configuration 501 is formed by a group 502 of resonating resonating sections 503, which are utilized to guide the electromagnetic energy through a construction supply 90, which can be a building structure, a wall or a window, for example. A distant radio device or a base station (not shown) is located at the space of an incident electromagnetic radiation 80. This space is effectively isolated from a space of the target radio device 81 due to the large attenuation of the construction supply 90. Typical attenuation due to the construction supply can be of the order of 20-40 dB.

According to an embodiment of the present disclosure, the passive repeater configuration 501 is embedded into or attached with the construction supply 90 to create a propagation tunnel for electromagnetic energy with low attenuation. The aim is to guide and re-radiate the energy provided by the incident electromagnetic radiation 601 as an emitted electromagnetic radiation 603 to the separated space 81. The guided electromagnetic energy 602 is carried by the passive repeater configuration 501.

Figure 2:
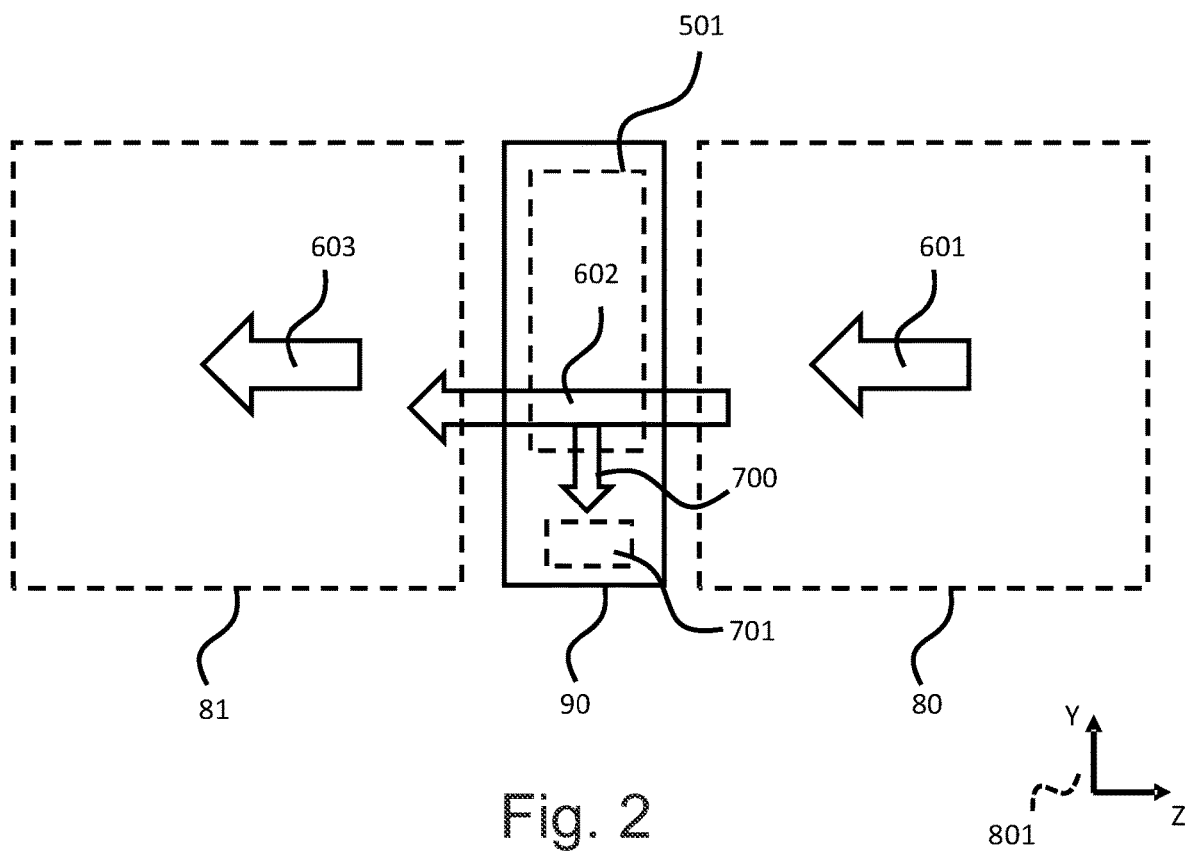
FIG. 2 shows an abstraction of the present disclosure with an external antenna connector, in accordance with an embodiment.

In addition, the aspects of the disclosed embodiments has a secondary functionality, illustrated in FIG. 2. The secondary functionality relates to a solution to utilize a part of the construction supply as an antenna to provide amplified signal levels for electric radio receivers. An antenna configuration 701 is integrated within the construction supply 90 to capture a fraction of the guided electromagnetic energy 602. This received electromagnetic energy 700 can be guided to external radio devices, such as wireless local area network (WLAN) routers or active cellular repeaters. The amount of energy received by the antenna configuration 701 is smaller than the total guided electromagnetic energy 602.

Antenna configuration 701 is coupled with the group of resonating sections 502 by electromagnetic coupling means. For an efficient performance, it is advantageous that the antenna configuration 701 locates in a near field of a resonating section 503, so that the passive repeater configuration 501 can be used to effectively connect the antenna configuration 701 to the space of the incident electromagnetic wave 80.

Figure 3:
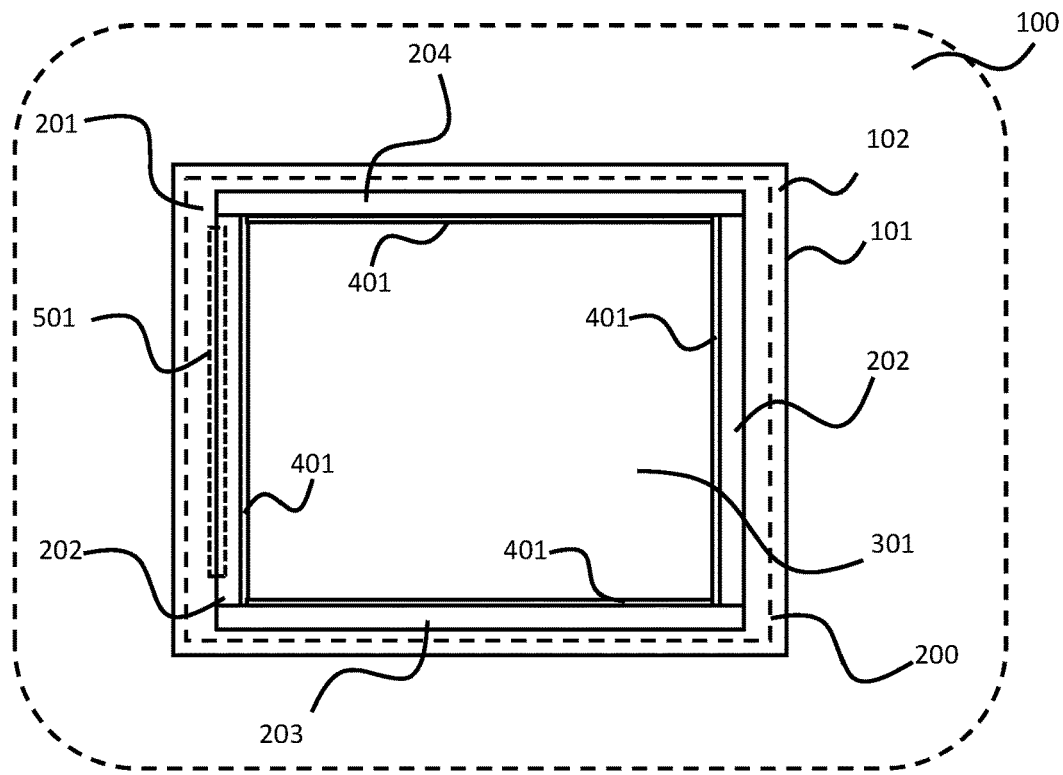
FIG. 3 shows an example of an embodiment in which the device is installed in connection with a window.
Figure 4:
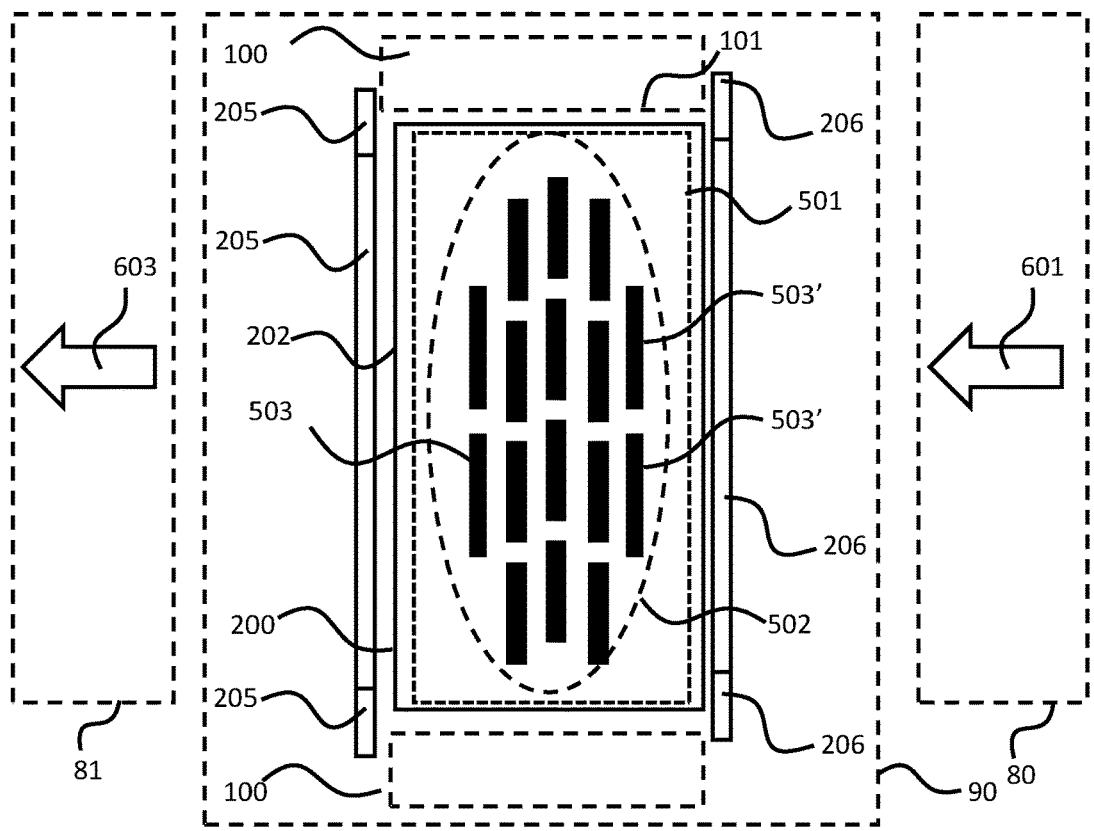
FIG. 4 is a principle view showing the structure of a device according to an embodiment of the present disclosure.

FIG. 3 shows as a front view an example of an embodiment in which the device 501 operating as a passive repeater configuration is installed in connection with a window 200 and FIG. 4 shows as a side view the example of FIG. 3, and an exemplary arrangement of the resonating sections. The window 200 may be an energy saving window assembly, for example. The passive repeater configuration 501 is formed by a group 502 of resonating resonating sections 503, which are utilized to guide the electromagnetic energy through or beside the construction supply 90.

The window assembly 200 may have a variety of different forms. Here, a typical solution of a window that can be opened is presented as a non-limiting example. Frames 201 and sashes 401 of the window assembly 200 may be composed of wood, aluminium, plastic, fiberglass, or other composite materials, but the implementations are not limited to these materials. A wall 100 is holding the window assembly 200. The wall 100 can be made of common construction materials, e.g. concrete, reinforced concrete, wood, stone, and/or some other material(s). The window assembly 200 is located in a wall aperture 101. There is usually a gap of approximately 1-2 centimetres between the wall aperture 101 edge and the window frame 201. This installation gap 102 may be sealed with polyurethane foam or using other insulation material. The frame 201 consists of jambs 202 at the sides of the frame, sill 203 at the bottom, and a head 204 at the top of the frame. The window assembly 200 further comprises a sash 401 which is held inside the frame 201. The sash 401 is holding the glass 301. The window assembly 200 may contain one or more layers of glass 301 panels. Typical implementation includes 3-4 glass panels, where thermal insulation gas may be held between adjacent glass panels. There may be one or more glasses with a selective surface coating and/or another kind of coating.

In this illustrative example the passive repeater configuration 501 is integrated with the jamb 202 of the window assembly 200. The passive repeater configuration 501 may be partly or entirely inserted to the jamb 202. It can also be integrated with other parts of the frame 201. In this illustrative example, the passive repeater configuration 501 exploits part of the installation gap 102 at the side of the frame 201. It may also be integrated with the interior surface of the jamb 202. Furthermore, the passive repeater configuration may be directly installed to the edge of the wall 100 in the window installation gap 102. The window assembly 200 may also comprise an inside casing 205, which may be made of, but not limited to, wood, fiberglass, or plastic. An exterior shell 206 with an aluminium clad may be used to provide weather protection for the window frame 201. In this example, the passive repeater configuration 501 is installed to the side jamb 202 of the window.

The passive repeater configuration 501 according to this embodiment comprises a group 502 of resonating sections 503, in which the resonating sections 503 are configured in an assembly with each resonating section 503 positioned in the near field of the adjacent resonating sections 503. A first resonating section 503' of each contiguous subarray in the group 502 receive electromagnetic radiation of incident electromagnetic radiation 601. These first resonating sections 503' re-radiate the electromagnetic energy through the group 502 of resonating sections as will be explained in more details later in this specification.

The passive repeater configuration 501 is used to transfer the incident electromagnetic radiation 601, arriving from the space of the incident electromagnetic wave 80, through the construction supply 90, and radiating to the space of the target radio device 81 as an emitted electromagnetic radiation 603. In this illustrative example, the construction supply 90 refers to the window assembly 200, in which the passive repeater configuration 501 have been installed.

Figure 5:
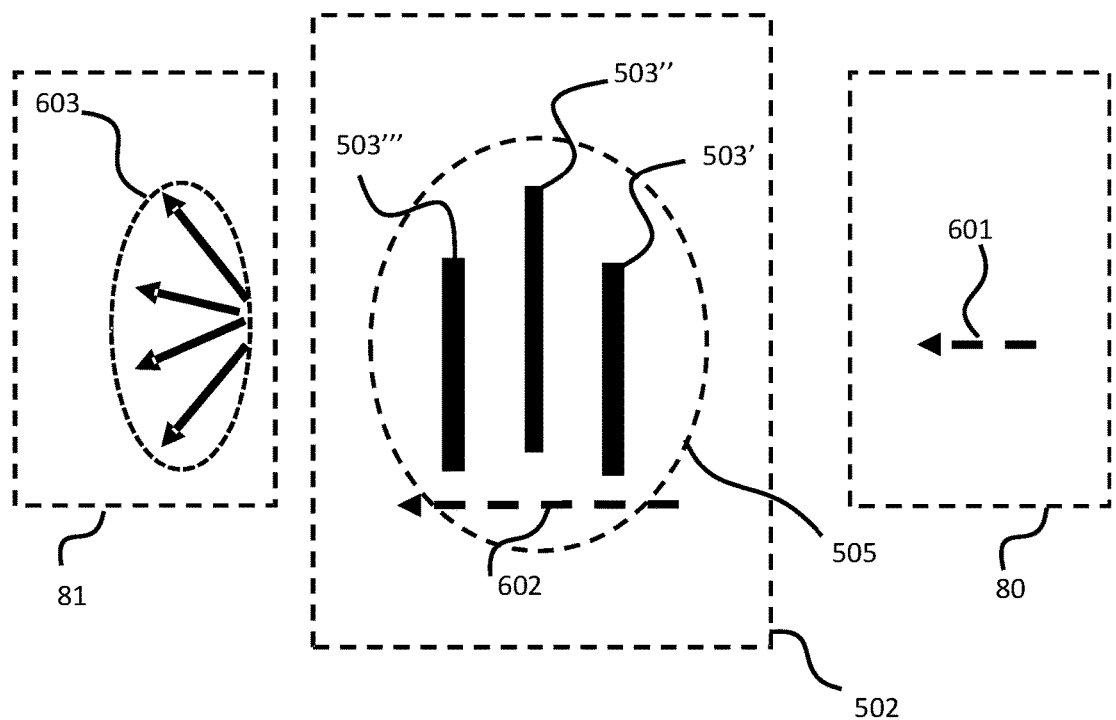
FIG. 5 shows a schematic drawing of a contiguous subarray of resonating sections, in accordance with an embodiment.

FIG. 5 shows a schematic drawing of a contiguous subarray 505 of resonating sections, which is used here to explain the functionality of the invention, in accordance with an embodiment. For efficient performance, more than one contiguous subarrays 505 are assembled in a vertical direction to further form an effectively working group 502 of resonating sections, and this is also further explained below. First, the operation of a single contiguous subarray is explained.

The first resonating section 503' is configured to the side of the construction supply 90, which locates closest to the space 80 of the incident electromagnetic wave. Incident electromagnetic radiation 601 induces currents to the first resonating section 503', which is the first element to interact with the incident electromagnetic radiation 601. These currents that are formed in the first resonating section 503', oscillate at the frequency of the incident electromagnetic radiation. The oscillating currents in the first resonating section 503' further act as a source of radiating electromagnetic energy. This radiated electromagnetic energy is coupled by electromagnetic means to the second resonating section 503", which is configured to the electromagnetic near field of the first resonating section 503'. A second resonating section 503" is positioned in the horizontal direction from, and in the near field of the first resonating section 503', which means that electromagnetic energy is guided a small distance through the construction supply 90 without creating thermal bridges.

Resonating sections 503 are configured in a contiguous subarray on an iterative manner to form a horizontally extended set of resonating sections. The induced currents in the second resonating section 503" act as a source of radiation, which couple to a third resonating section 503''' by electromagnetic means, and which is configured to the electromagnetic near field of the second resonating section 503".

When multiple resonant resonating sections are formed in a contiguous subarray, extending in the horizontal direction, a guided path for the electromagnetic energy to propagate through the construction supply 90 is formed at the resonant frequency range of the resonating sections 503, 503', 503", 503'''. This guided electromagnetic energy 602 propagates due to the near field coupling between resonating sections 503, 503', 503", 503'''.

In this schematic example, the third resonating section 503''' is configured to the vicinity of the space of the target radio device 81. The induced currents in the third resonating section 503''' act as a source of electromagnetic radiation. Emitted electromagnetic radiation 603 can be exploited by wireless radio equipment, which are located in the space of the target radio device 81.

Figure 6:
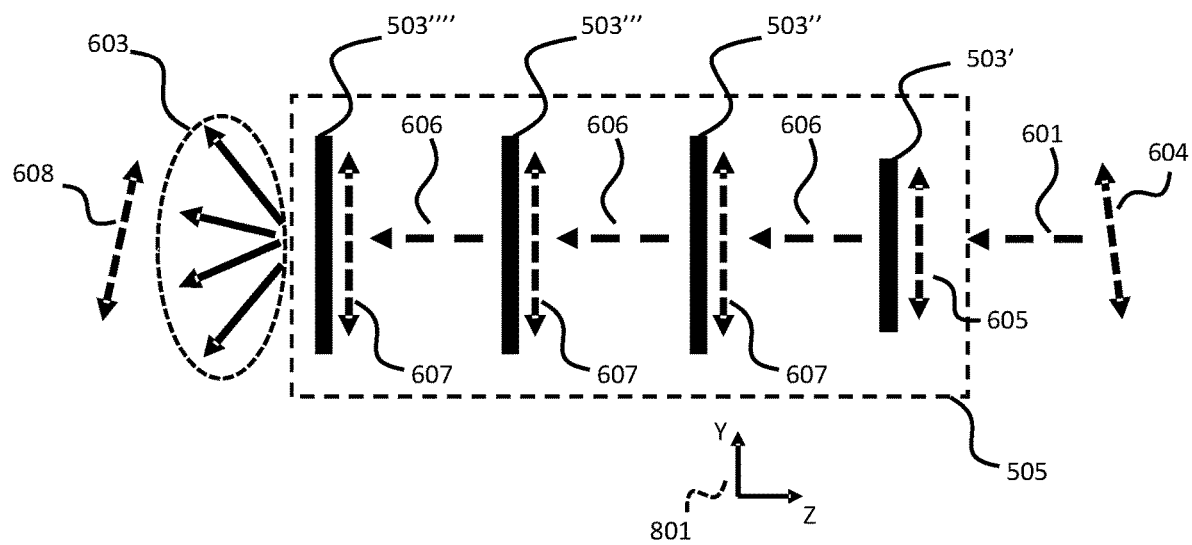
FIG. 6 shows an abstraction of the signal propagation path through a single contiguous subarray, in accordance with an embodiment.

FIG. 6 shows an abstraction of the signal propagation path 602 through a single contiguous subarray 505. FIG. 6 shows four resonating sections but it is obvious that in practical implementations the number of resonating sections 503 may be different from four. For example, the device 501 may comprise two, three or more than four resonating sections 503.

The operation principle of the passive repeater configuration 501 is explained in the following. First, a distant source of electromagnetic field transmits a radiated electromagnetic signal, which is seen as a farfield source for the passive repeater configuration 501. This incident electromagnetic radiation 601 induces oscillating currents 605 to the first resonating section 503' of the passive repeater configuration 501. The incident electromagnetic radiation 601 contains an electric field component 604, which may have an arbitrary polarization alignment at the frequency of operation. This polarization is first determined by the transmitting antenna characteristics in the space of the incident electromagnetic wave 80, but it is largely affected by multipath propagation effects as it reaches the passive repeater configuration 501. The electric field component of the electromagnetic wave 604 induces current 605 to the first resonating section 503' which oscillates at the same frequency as the incident wave oscillates. These oscillating currents 605 act as a new source of radiation, which facilitate electromagnetic coupling 606.

One feature of the resonating section 503 is that it is electrically floating so that the received electromagnetic energy is not guided to any external electrical load, such as a radio receiver circuit. Due to conservation of energy, the received electromagnetic energy is effectively radiated from the electrically floating resonating section 503' as the induced currents in the floating low-loss element oscillate. The sources of loss are the resistive loss of the resonating section 503', dielectric loss of the surrounding non-conductive materials, and energy loss due to radiation. In the present disclosure, the aim is to maximize the amount of radiated energy.

A second floating resonating section 503" is configured in the electromagnetic near field of the first resonating section 503'. Electromagnetic coupling 606 between the resonating sections induces currents 607 to the second resonating section 503". The second resonating section 503" is also electrically floating in order to effectively re-radiate the coupled electromagnetic energy to the next resonating section.

When the second resonating section 503" is located in the near field of the first resonating section 503', a contiguous subarray 505 of resonating sections is formed. This contiguous subarray of resonating sections 503 starts from one side of the wall or window structure, and continues through the structure all the way to the other side of the structure. To be more precise, the resonating sections 503 are configured in a contiguous subarray on an iterative manner to form a horizontally extended set of resonating sections to guide the electromagnetic energy. The contiguous subarray may also extend in vertical directions, and thus form a meandering paths for the electromagnetic energy to propagate, but the dominant extension of each contiguous subarray can be observed to propagate through the construction supply using the shortest possible path.

The contiguous subarray 505 may further be extended in an iterative manner, including an element 503''' in this example, until the last resonating section 503'''' is reached.

The last element 503'''' of the contiguous subarray 505 acts as a radiating element which emits the guided electromagnetic energy 602 to the space behind the wall or window structure. The emitted electromagnetic radiation 603 contains an electric field component 608, which is determined by the alignment of the last resonating section 503''''. The alignment of the electric field component of the emitted electromagnetic wave may not be similar for each frequency of operation.

The number of resonating sections 503 in a contiguous subarray 505 which penetrates through the wall is not limited by this given example, as it depends both on the characteristic of the wall or window configuration and the frequency at which the elements 503 operate. A practical, but not limiting example can be given with a 200 mm thick window frame, where there are preferably at least from 3 to 5 elements configured in a contiguous subarray.

Element spacing in the contiguous subarray 505 of resonating sections 503 is preferably between from one tenth of a wavelength to a one quarter of a wavelength, but it is not fully bound to these given limits, as it can be much smaller, for example. The resonating sections 503 may be configured to operate at the reactive near field of the adjacent resonating sections. By these means, strong electromagnetic coupling 606 may be provided, which is needed to effectively guide electromagnetic energy 602 through wall or window structure. The element spacing within the group of resonating sections may be non-uniform, depending on the location of the element 503 within the group 502 of resonating sections. The elements 503 can also be interleaved to increase electromagnetic coupling 606 between adjacent elements. It may also be an aim to cover multiple operational frequency ranges with single resonating sections 503. This means that targeting so some specific element-to-element distances bound by wavelengths may become arbitrary. For this reason, strong near field coupling is a more precise definition for element spacing than a distance in wavelengths.

The first resonating section 503' may be configured to receive vertically or horizontally polarized electric field components 604, or any superposition of vertically and horizontally polarized field components. Similarly, the last resonating section 503"" may be configured to receive and/or transmit vertically or horizontally polarized electric field components 604, or any superposition of vertically and horizontally polarized field component. The polarization angle of the incident electromagnetic wave 604 may not be the same than the polarization angle of the emitted electromagnetic wave 608.

Figure 7:
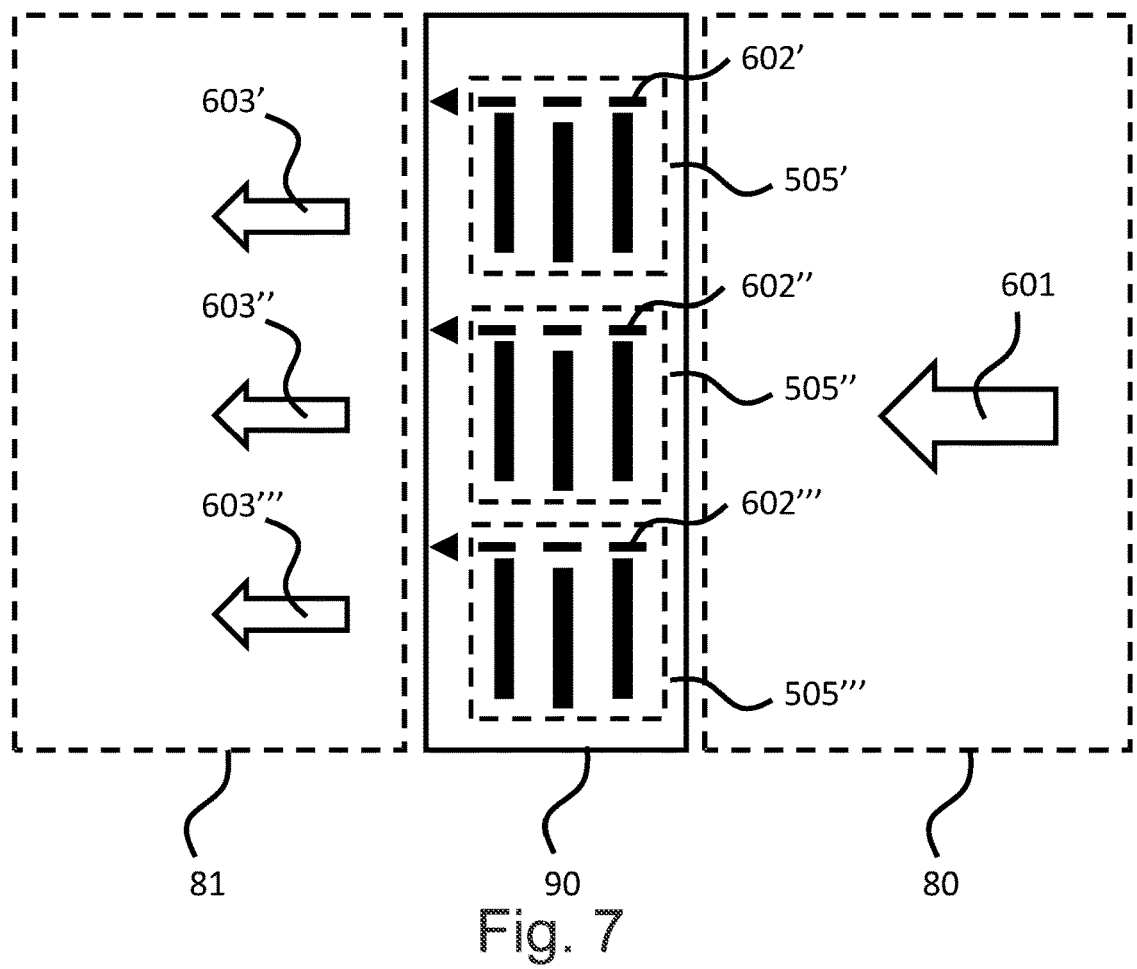
FIG. 7 shows an abstraction where multiple contiguous subarrays are assembled in a vertically aligned stack to improve the performance, in accordance with an embodiment.

FIG. 7 shows an abstraction where multiple contiguous subarrays 505', 505", 505'" are assembled in a vertically aligned stack to improve the performance. This example demonstrates the alignment of multiple contiguous subarrays on a vertically aligned stack, but the invention is not limited to the number of contiguous subarrays presented here. A first contiguous subarray 505' of resonating sections is configured within a construction supply 90 to provide a propagation tunnel for electromagnetic energy, which is received from the incident electromagnetic radiation 601.

A second contiguous subarray 505" of resonating sections is configured within a construction supply 90, in an arrangement, where the second contiguous subarray of resonating section 505" is positioned in the vertical direction from the location of the first contiguous subarray of resonating sections 505'. The vertically aligned configuration of two contiguous subarrays forms an array-like group, which may improve the operation. A third contiguous subarray 505'" of resonating sections is configured within a construction supply 90, in an arrangement, where the third contiguous subarray of resonating section 505'" is positioned in the vertical direction from the location of the second contiguous subarray of resonating sections 505". Each of the contiguous subarrays 505',505",505'" provide a propagation tunnel for electromagnetic energy, and carry guided electromagnetic energy 602', 602", 602'", which is received from the incident electromagnetic radiation 601. Each contiguous subarray 505',505",505'" of resonating sections acts as a source of emitted electromagnetic radiation 603', 603", 603'" to the space of the target radio device 81. With careful design and positioning of the contiguous subarrays 505',505",505'", these separated sources of emitted electromagnetic radiation 603',603",603'" contribute to a constructive interference inside the space of the target radio device 81. As a result, the radiated electromagnetic waves sum in phase, and a radiation pattern with controllable directivity can be obtained. The maximum directivity of this radiation pattern can be defined by the basis of array antenna design rules.

It may be an aim to steer the maximum directivity to the direction, which is perpendicular to the surface of the wall 100. By these means, the maximum communication distance provided by the passive repeater configuration 501 can be maximized at both sides of the wall 100.

In addition to radiation pattern improvements, using multiple contiguous subarrays 505 may increase the total amount of electromagnetic energy that is transferred from the space of the incident electromagnetic wave 80 to the space of the target radio device 81.

Figure 8:
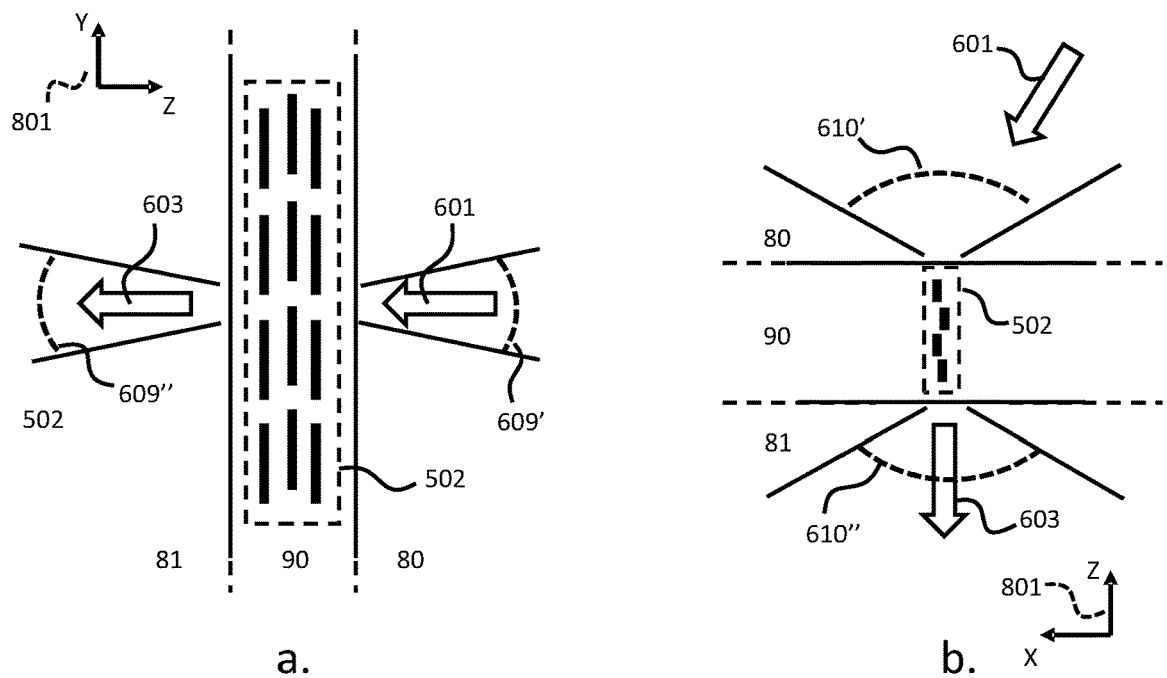
FIG. 8a shows an example of elevation beam width adjustment.
FIG. 8b shows an example of azimuth beam width adjustment.

FIGS. 8a and 8b show how it may be possible to maximize the efficiency by adjusting the radiation patterns of the repeater. FIG. 8a shows an example of elevation beam width adjustment and FIG. 8b shows an example of azimuth beam width adjustment.

One aim of the present disclosure is to receive electromagnetic radiation from a direction of a base station, or an equivalent radio contact point, and further to reradiate this received electromagnetic energy to a space where a target radio device is located. The most probable elevation angle where the electromagnetic signals of cellular base stations as well as other terrestrial radio stations arrive, with respect to a building wall, may be in a small elevation angle, which concentrates on both above and below the horizon. For this most probable direction of arrival, it is an aim to maximize the reception of an incident electromagnetic radiation 601 in elevation angles, which are concentrated around the horizon.

The elevation angle of the main lobe 609 describes the elevation beam width, in which the radiation pattern of the passive repeater configuration 501 has its highest directivity, and in which the reception and emission efficiency of electromagnetic energy is at its highest. 609' describes the elevation angle of the main lobe in the space of the incident electromagnetic wave 80. 609" describes the elevation angle of the main lobe in the space of the target radio device 81. The radiation characteristics of the passive repeater configuration may be reciprocal, which means that the propagation of the electromagnetic signal behaves similarly in both propagation directions.

In the following, the functionality of the passive repeater configuration 501 is described with bistatic and monostatic radar cross sections. The use of radar cross sections in the analysis of the passive repeater configuration may be beneficial because there are no actual antennas or connectors feeding electromagnetic energy to the system, but rather a farfield plane wave is used for the illumination of the structure.

First, in a monostatic radar cross section, elevation angle of the main lobe 601' shows a beam width of the minimum backscattered electromagnetic signal, which can also be interpreted as the targeted minimum area of the monostatic radar cross section, when the incident electromagnetic radiation 601 arrives from the space of the incident electromagnetic wave 80. In a bistatic radar cross section, elevation angle of the main lobe 601" shows the beam width of the targeted maximum of the bistatic radar cross section, when the incident electromagnetic radiation 601 arrives from the space of the incident electromagnetic wave 80, and the emitted electromagnetic radiation 603 is interpreted as the scattered electromagnetic wave.

Narrow beam width in the elevation is achieved with the extension of the group 502 of resonating sections in the vertical direction. The beam control is defined with well-established rules of antenna array design.

The azimuthal angle, in which the incident electromagnetic radiation 601 arrives, can be any angle in the hemisphere defined by the wall 100. Therefore, it is an aim to maximize the azimuth angle of the main lobe 610. The beam width in the azimuth plane can be maximized when the width of the passive repeater configuration is kept small, which means that the group 502 of resonating sections appears as a narrow vertically extended group of resonating sections 503. The horizontal extension of the group 502 of resonating sections in the plane that is parallel to the wall 100 or the construction supply 90 is preferably kept smaller than one tenth of a wavelength.

It is emphasized here, that the main horizontal extension of the group 502 of resonating sections extends in a direction which is perpendicular to the plane of the wall 100 or the construction supply 90. This does not contribute to the beam width in the azimuth plane, but it guides the electromagnetic energy 602 through the construction supply 90.

The azimuth angle of the main lobe 610' describes the beam width in the space of the incident electromagnetic wave 80. This can also be analyzed using the monostatic radar cross section in similar manners than with the elevation angle 601'. The azimuth angle of the main lobe 610" describes the beam width in the space of the target radio device 81. This can also be analyzed using the bistatic radar cross section in similar manners than with the elevation angle 601".

Figure 9:
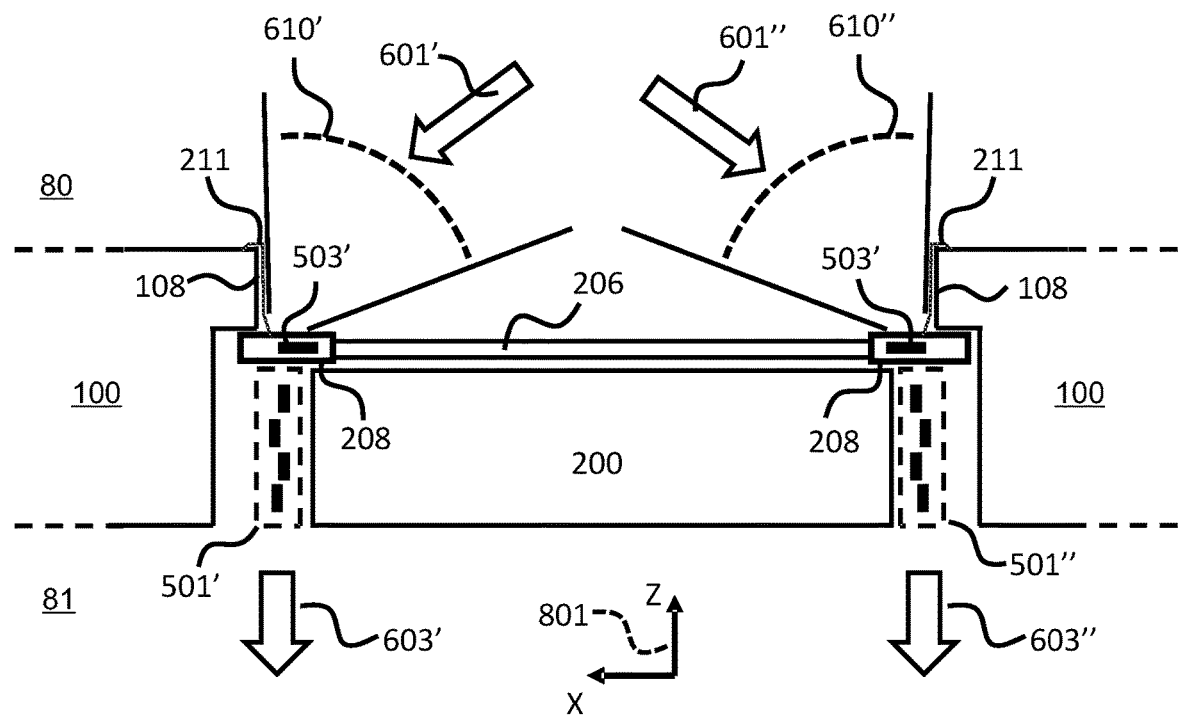
FIG. 9 shows an example of utilizing space diversity using multiple passive repeater configurations.
Figure 10:
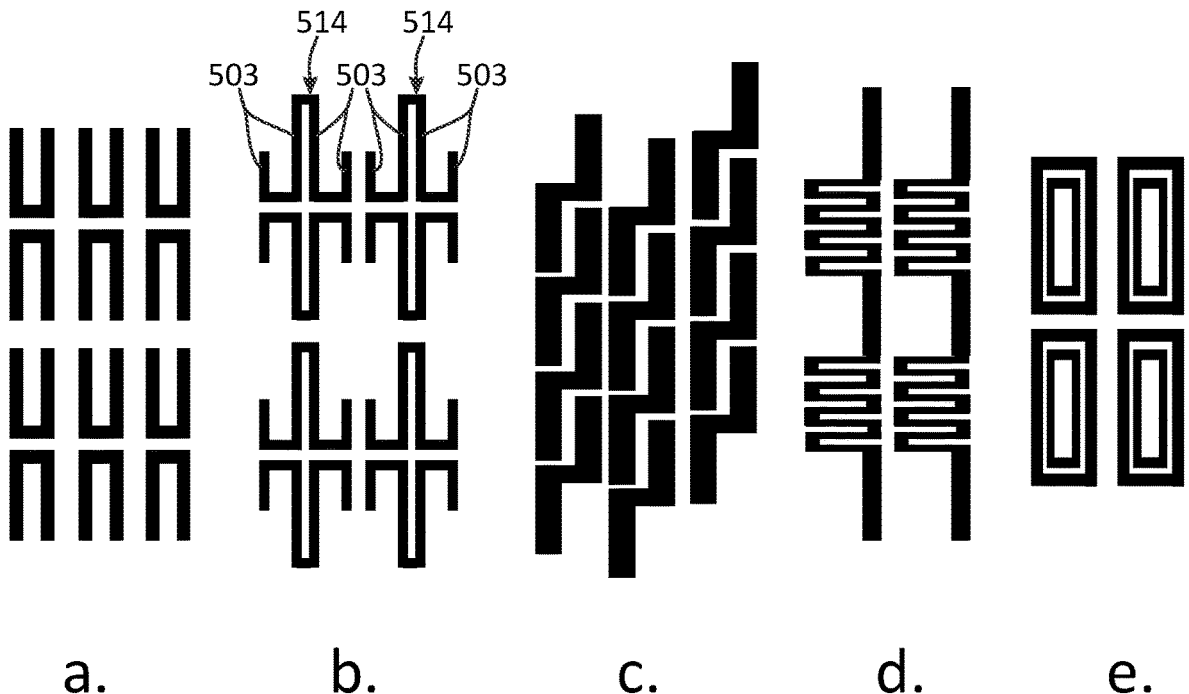
FIGS. 10a to 10e show examples of variations of shapes of the resonating sections.

FIG. 9 shows how space diversity can be utilized using multiple passive repeater configurations. Multiple assemblies of passive repeater configurations can be used to achieve extended azimuthal beam 610, increase the total amount of guided electromagnetic energy 602, and space diversity for space 81 and for the antenna configuration 701. In FIG. 9, the reference numeral 501' presents one passive repeater configuration, and the reference numeral 501" presents a second passive repeater configuration, assembled in another location of the construction supply 90. In the embodiment of FIG. 9 the window opening of the wall 100 has been partly covered by protective plates 211. These plates 211 may be metallic or other material which is resistant to weather conditions.

In some window assemblies, there exist shadowing edges 108 in the walls, which can lead to blind angles in the azimuth plane. To overcome this shadowing effect, the passive repeater configurations can be assembled in multiple jambs 202 in the same window 200. When the exterior shell 206 of a window assembly 200 has an aluminium cladding, the efficiency of the passive repeater configuration may be degraded due to shadowing of the metallic parts. To overcome this, an electrically non-conductive part of exterior shell 208 can be used in some or all locations around the window frame. The material can be plastic (PVC, uPVC), fiberglass, or any other composite or non-conductive material, which is suitable to be used in the outer surface of the construction supply. Also the entire frame can be made electrically non-conductive.

In accordance with an embodiment, the shadowing edge 108 may be partly covered by an electrically conducting sheet, such as a metal sheet. This may reduce possibly attenuating effects of the wall to the signal.

The resonating section 503' can also be integrated with the exterior shell 208 to further increase the efficiency. Also, the azimuth beam width may increase, when the first element has a wider visibility to the horizon.

Also, in the presence of the antenna configuration 701, the spatial diversity, which is provided by the use of multiple passive repeater configurations, can be used to improve signal quality for the attached radio receivers. Using multiple-input-multiple-output (MIMO) antennas in construction supplies 90, enhancements in data rates may be obtained, when compared to a case with using only single antenna configuration 701.

Some examples of variations of shapes of the resonating sections are illustrated in FIGS. 10a to 10e to show that the form of the resonating sections 503 need not be similar to the examples presented above. Some criteria for the design of the resonating sections 503 is that they are electrically conducting, the shape is such that they resonates at desired frequency or frequencies and that they don't form a cold bridge between outer and inner surfaces of a wall or a construction supply (i.e. between outer space and a room). Furthermore, it can be seen from examples of FIGS. 10a to 10e that the resonating sections 503 may be formed by one or more re-radiating elements 514. For example in the embodiment of FIG. 10b there are eight re-radiating elements 514 each comprising two or more resonating sections 503.

Figure 11A:
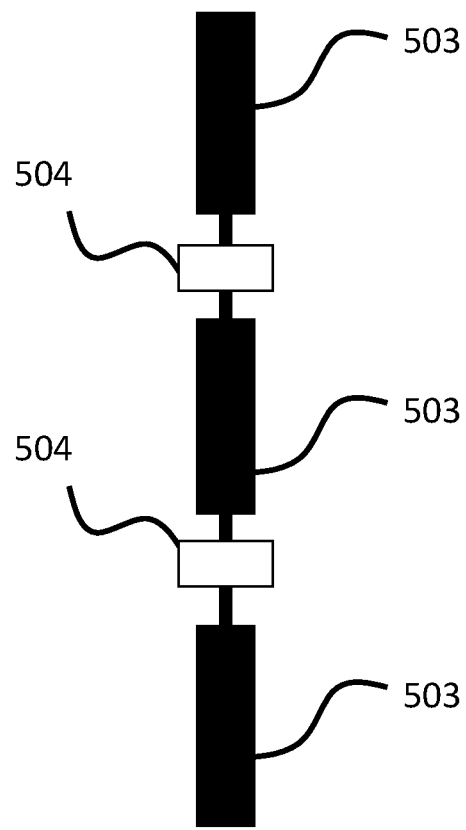
FIGS. 11a and 11b show an example of using inter-element tuning elements.
Figure 11B:
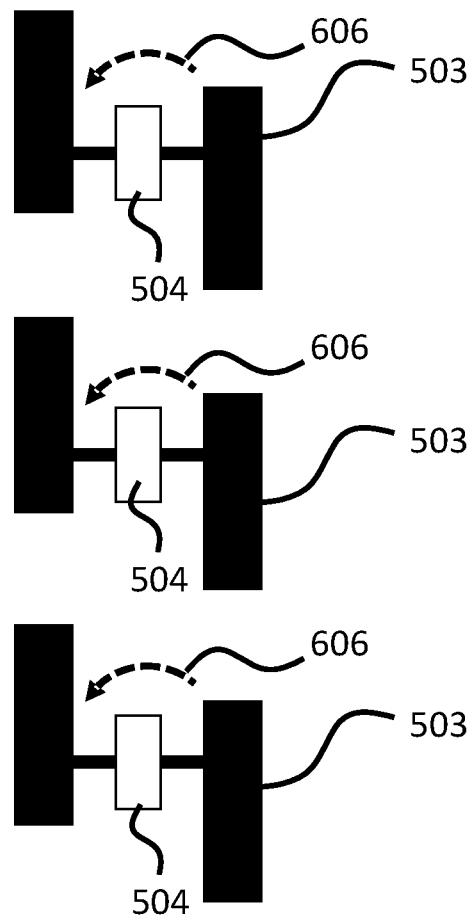

In accordance with an embodiment, the frequency behaviour of the passive repeater configuration 501 may be controlled for example by using inter-element tuning components. This may be useful especially in the case when there are multiple frequency ranges of operation designed for single resonating sections 503. FIGS. 11a and 11b illustrates an example of such an embodiment. In the embodiment of FIG. 11a the tuning components are vertical tuning components, and in the embodiment of FIG. 11b the tuning components are horizontal tuning components. It is clarified that even if there are not any external electrical loads to which the electromagnetic energy is guided to, it may be possible to use inter-element tuning components 504 ("from one 503 to another 503") embedded within the group 502 of resonating sections.

An inter-element tuning component 504 is a passive lumped or distributed component, which is used to adjust the electromagnetic behaviour of a resonating section 503, or a group of such elements. The tuning component may be an inductor or a capacitor, or a combination of such components. The tuning components 504 can be used to adjust the impedance of the resonating section 503 to improve the coupling of the incident electromagnetic radiation 601 to the first resonating section 503'. The tuning components 504 can also be used to adjust the frequency behaviour of higher order resonances of a single resonating section. A practical, but not limiting example is such that a resonating section is configured to operate at its lowest resonance frequency at around 900 MHz, and inter-element tuning components are used to configure the same element 503 to resonate effectively also at 1800 MHz and 2100 MHz frequency ranges. In addition to the previous example, also such use case can be obtained where inter-element tuning components 504 are used to increase the electromagnetic coupling 606 between resonating sections 503.

Figure 12A:
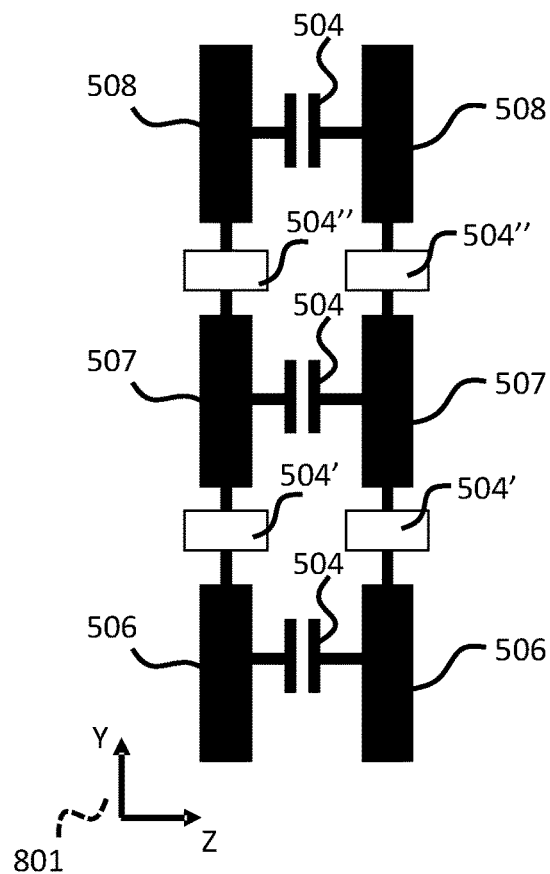
FIG. 12a shows another example of using inter-element tuning elements.
Figure 12B:
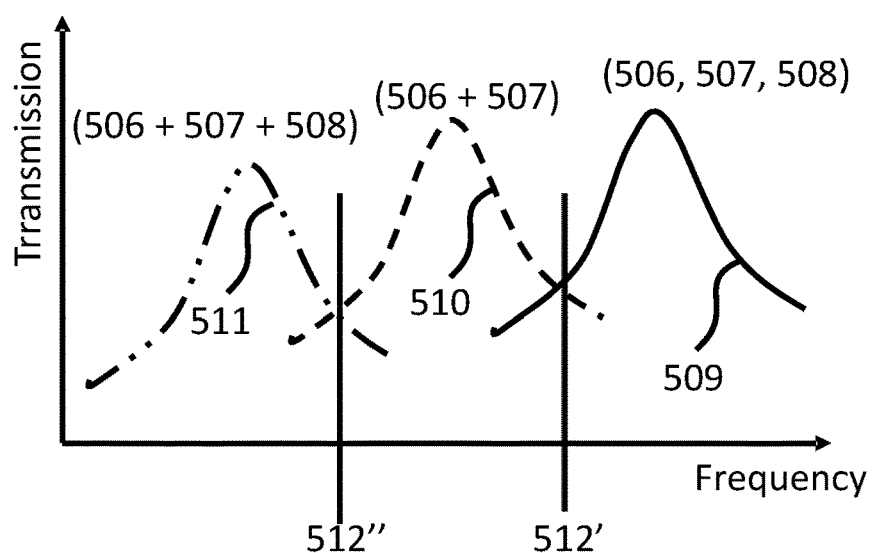
FIG. 12b shows frequency responses of the embodiment of FIG. 12a, in accordance with an embodiment.

FIG. 12a shows an example, where both horizontal and vertical tuning components are illustrated. In this example, each resonating section 506, 507, 508 have equal lengths for simplicity, but the lengths can also be unequal. In this example, numbers 506-508 are used instead of 503 to highlight the differences in frequency domain behaviour when the elements are combined with inter element matching components. All elements 506, 507, 508 resonate at a frequency range A, which is shown with 509 in the frequency response of FIG. 12b. The transmission channel at frequency range A is illustrated with a curve 509. This is assumed here to represent the operational frequency range, i.e. the transmission channel in frequency domain, for each individual elements 506, 507, and 508. The curve 510 illustrates the frequency response of a transmission channel at frequency range B (B<A), which is the transmission channel in frequency domain for a combination of elements 506 and 507. The curve 511 illustrates a transmission channel at frequency range C (C<B), which is the transmission channel, in frequency domain, for a combination of elements 506, 507, and 508. The tuning element 504' is a low pass filter with a cutoff frequency 512', used between vertically stacked elements 506 and 507. The cutoff frequency is lower than the operational frequency range A (509), and higher than the operational frequency range B (510). The elements 506 and 507 are therefore electrically combined with the low pass filter 504', and form a new transmission channel B in a frequency range 510, which is lower than frequency range A. Similarly, the tuning element 504" is a low pass filter, with a cutoff frequency 512" lower than the operational frequency range B (510). This combines all the vertically stacked elements (506, 507, and 508) in this example, to form a third operational frequency band C (511), which is lower than the frequency band 510.

In this example, it was shown one method how resonating sections can be electrically joined to form additional operational frequency bands without affecting the shapes of the individual resonating sections. Different resonating sections can also have multiple resonant frequency ranges of operation themselves, which can further be elaborated using appropriate inter element tuning components.

The possible combination of different filtering circuits are not limited by the examples shown here. Different parts of the group 502 of resonating sections may have different combinations of inter element matching components. In addition to the method of electrically extending the length of separated resonating sections, also another exemplary method is presented here. Capacitors 504 can be added between horizontally formed pairs of resonating sections. This is one method to increase the electromagnetic coupling between adjacent elements, and therefore improve the efficiency of the structure to guide electromagnetic energy 602 through the structure 501. By using appropriate capacitor values, the transmission impedance from a resonating section to an adjacent resonating section may become smaller. This is due to the more efficient electromagnetic coupling.

According to the aspects of the disclosed embodiments, the device 501 may also have a secondary functionality in which a part of the construction supply 90 is configured to receive electromagnetic signals from external base stations or other wireless communication equipment, and to provide an amplified signal level that can be utilized by wireless radio appliances.

Figure 13:
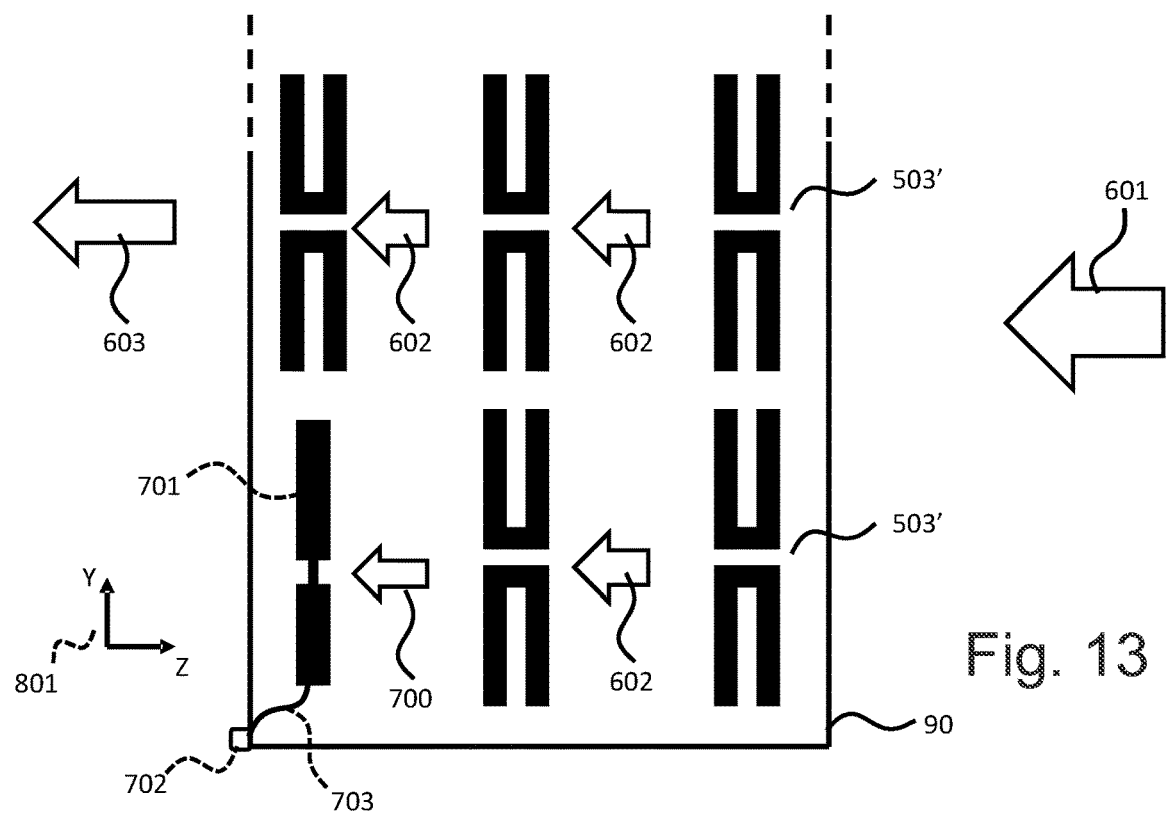
FIG. 13 shows coupling of resonating sections with an antenna configuration, in accordance with an embodiment.

The secondary functionality relates to a configuration to utilize a part of the construction supply as an antenna to provide amplified signal levels for electric radio receivers. FIG. 13 shows an example of coupling of resonating sections 503 with an antenna configuration 701. This configuration is integrated with a construction supply 90, which can be, e.g. a part of a window frame, a rigid insulation panel (such as polyurethane), or a wooden wall supporting bar. An antenna configuration 701 may be used to capture a fraction of the guided electromagnetic energy 602. This received electromagnetic energy 700 can be guided to external radio devices, such as wireless local area network (WLAN) routers or active cellular repeaters. The amount of energy received by the antenna configuration 701 is smaller than the total guided electromagnetic energy 602. The antenna configuration 701 is coupled with the group 502 of resonating sections by electromagnetic coupling means. For an efficient performance, it is advantageous that the antenna configuration 701 locates in a near field of a resonating section 503 so that the passive repeater configuration 501 can be used to effectively connect the antenna configuration 701 to the space of the incident electromagnetic wave 80. Furthermore, a part of the electromagnetic energy of the incident electromagnetic radiation 601 may be guided to the antenna connector 702 using antenna connection means 703, such as coaxial cable, or contact springs. In this configuration, the first elements 503' receive and re-radiate the incident electromagnetic radiation 601. Arrows 602 illustrate the guided electromagnetic energy and arrows 700 illustrate a part of the received electromagnetic energy, which is guided to the antenna connector 702.

Figure 14:
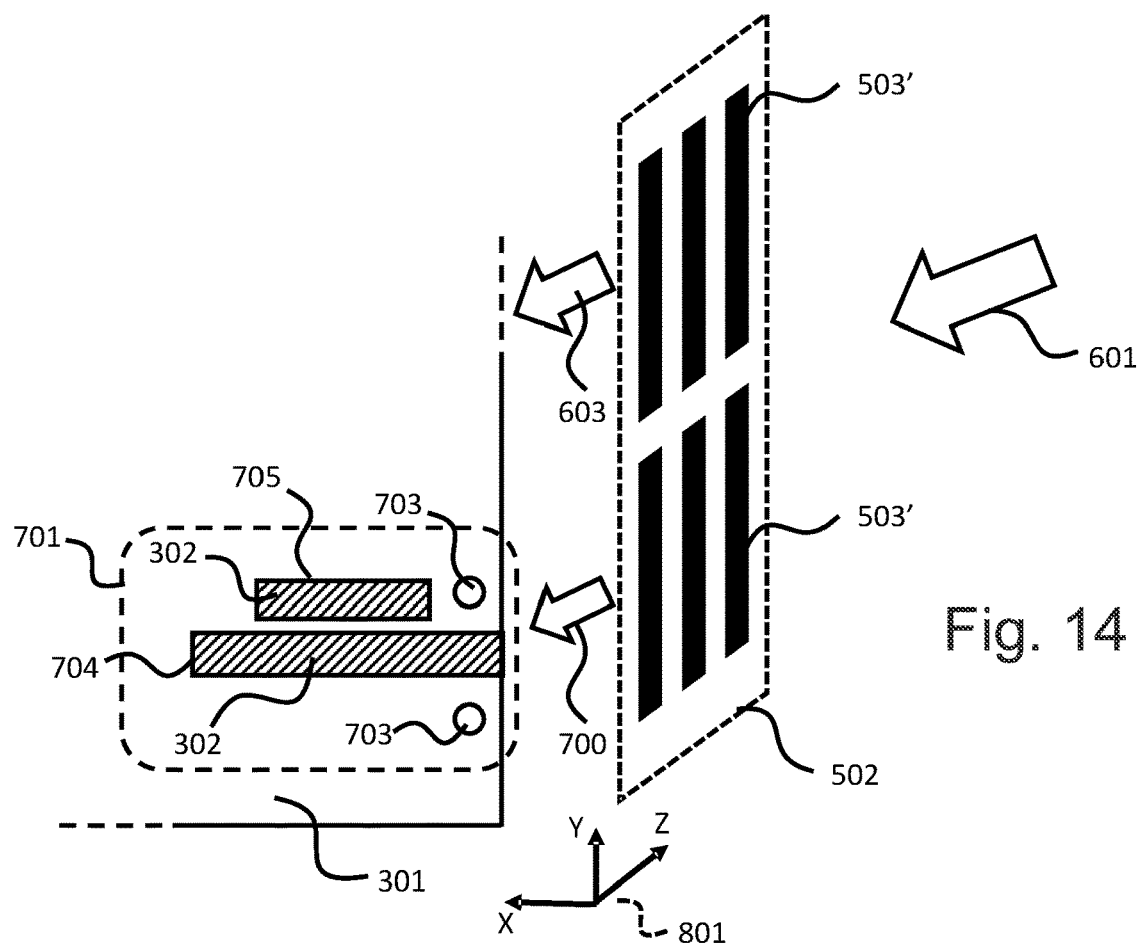
FIG. 14 shows resonating sections coupled with an antenna configuration, where the antenna is implemented in a selective surface of a window glass.

FIG. 14 shows resonating sections 503' coupled with an antenna configuration 701, where the antenna is implemented in the selective surface of a window glass. The antenna configuration 701 is implemented directly to the electrically conductive selective surface of the glass 301. Uncoated surface of glass 302 is used to form the radiating elements of the antenna. By removing carefully designed patterns of the selective surface coating, slot antenna radiators can be formed in the surface of the glass 302. The main radiating element 704 is used to guide received electromagnetic energy to the antenna connector 702 through the antenna connection means 703. In the surface of the glass 302, connection springs, or a contactless electromagnetic coupling element can be used for that purpose, for example. A parasitic radiating element 705 can be configured in the vicinity of the main radiating element 704 to create additional operational frequency areas for the main radiating element, or to enhance the operational frequency band of the main radiating element 704.

FIGS. 15a and 15b illustrate an example of how to integrate the passive repeater configuration with a window assembly 200. The passive repeater configuration 501 is integrated with the outer side of the jamb 202. A protective cover 513 can be added to the structure to provide mechanical protection against abrasion or environmental effects, such as moistness. The passive repeater configuration can also be integrated with the inner side of the jamb 202, when it becomes more visible, and protective cover 513 becomes a visual surface. The protective cover 513 can be any electrically non-conductive material, such as wood, plastic, fiberglass or any other composite material, or it can also be a layer of paint or varnish. In this example, it is also illustrated how the electrically non-conductive part of the exterior shell 208 can be utilized to hold the first elements 503' of the group 502 of resonating sections. The electrically non-conductive part of the exterior shell 208 may also provide mechanical and environmental protection (rain & UV-protection, for example) for the passive repeater configuration. In this example, the first elements 503' are located on a physically separated carrier before the assembly. An alternative method is to use a wide carrier material, such as a non-conductive flex sheet in which the elements 503 are etched. Such wide flex can be attached to the side of the jamb 202, and then folded to locate the first elements 503' under the electrically non-conductive part of exterior shell 208 (to match with the case shown in FIG. 15b).

In accordance with another embodiment, the protective cover 513 may be electrically conductive, such as a metal mesh.

FIGS. 16a and 16b illustrate an example where the resonating sections 503 are embedded inside the window frame. A window frame 201, or a part of it, such as a jamb 202 can be made using electrically non-conductive materials, such as fiberglass, uPVC, or other suitable material. It is common that insulation cavities 209 are utilized inside the frame to improve the energy efficiency of the window frame. These insulation cavities 209 can be air filled, gas filled, or there can also be some other insulation materials with low thermal conductivity, such as polyurethane foam (PUR, PIR). The insulation cavities 209 provide usable integration locations for resonating sections, and these cavities can be used to configure a part of the window assembly 200 to operate as a passive repeater configuration 501. The elements 503 may be cut from a metal, but these can also be made out of any other electrically conductive material, such as carbon fiber. In FIG. 16a the reference numeral 204 represents a head of the window (i.e. the top part of the window), the reference numeral 100 represents a wall, and the reference numeral 208 represents an electrically non-conductive part of the exterior shell.

Figure 17:
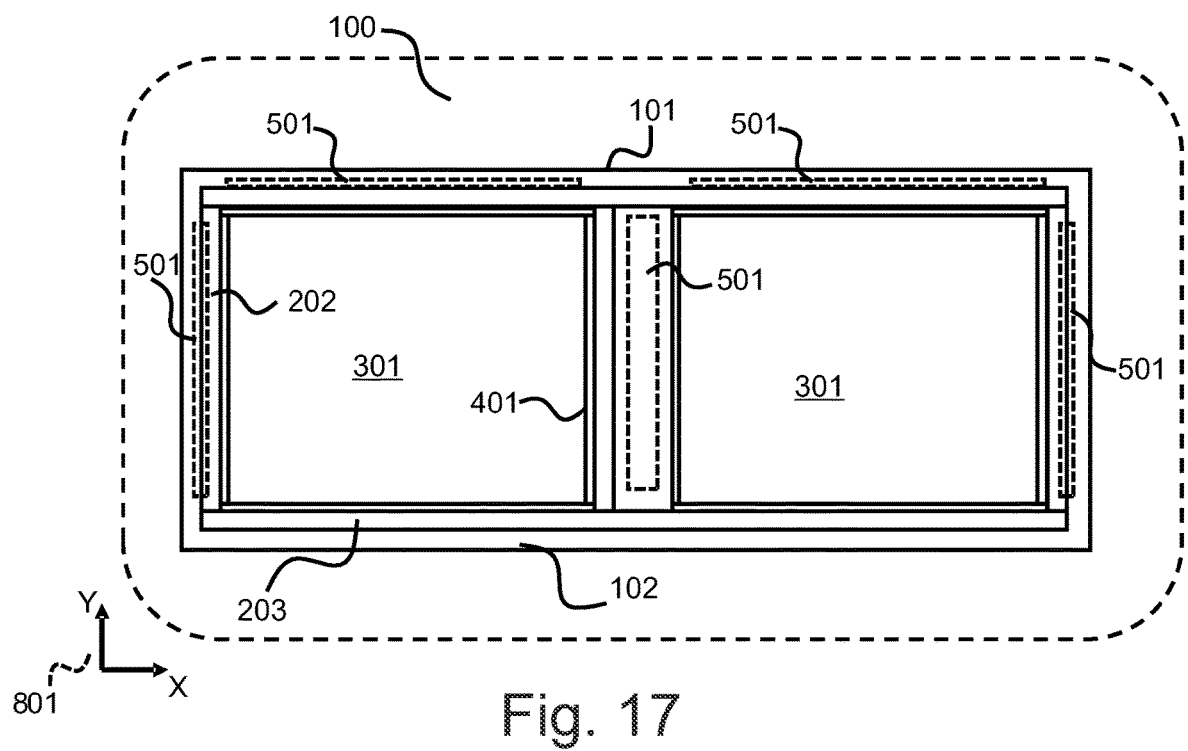
FIG. 17 illustrates an example in which two passive repeaters are installed horizontally above a window.

FIG. 17 illustrates an example in which two passive repeaters 501 are installed horizontally above the window 301 and two passive repeaters 501 are installed vertically beside the window 301.

Figure 18A:
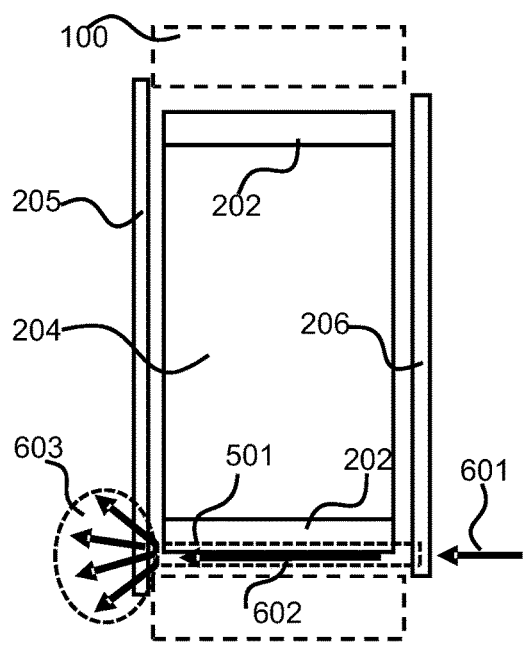
FIGS. 18a and 18b illustrate an example of another integration example, where an extension to the passive repeater configuration is used.
Figure 18B:
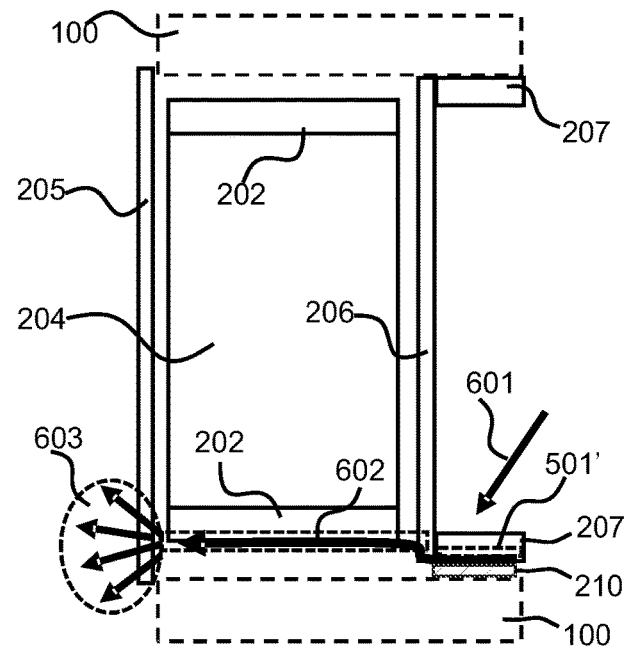

FIGS. 18a and 18b show another integration example, where an extension to the passive repeater configuration 501 can be used. The extension 501' may be attached with an external side jamb 207, for example. In accordance with an embodiment, an electrically conducting strip 210 may be installed between the extension 501' and the wall 100, as is illustrated in FIG. 18b, This strip 210 may reduce or even eliminate losses which the wall 100 may cause to an electromagnetic signal, especially when the wall 100 is a concrete wall.

Figure 18C:
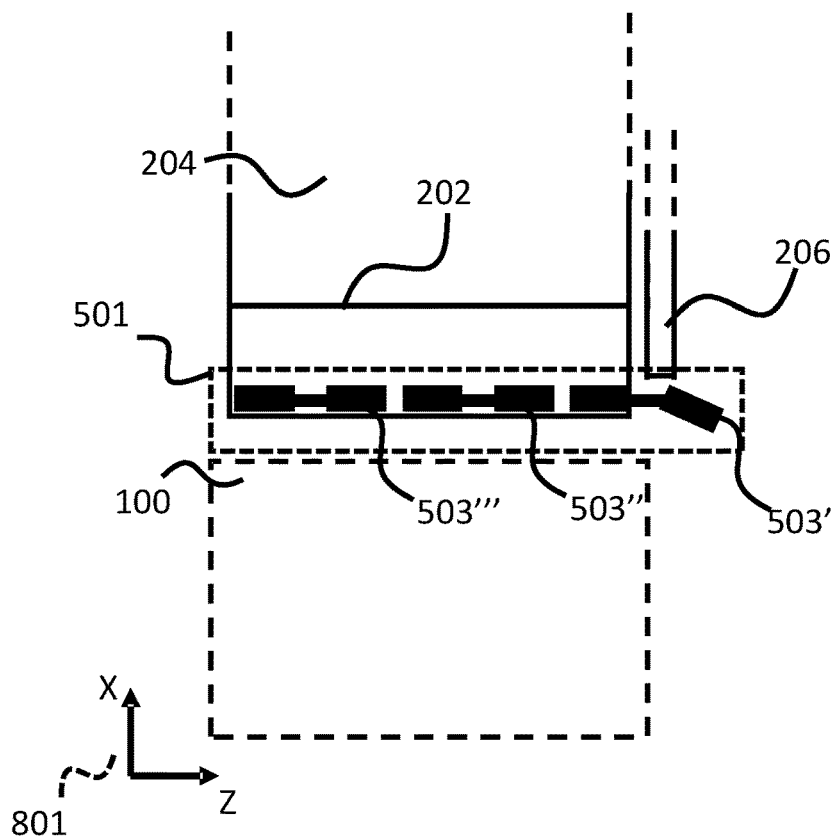
FIGS. 18c and 18d illustrate another example, where an extension to the passive repeater configuration is used.
Figure 18D:
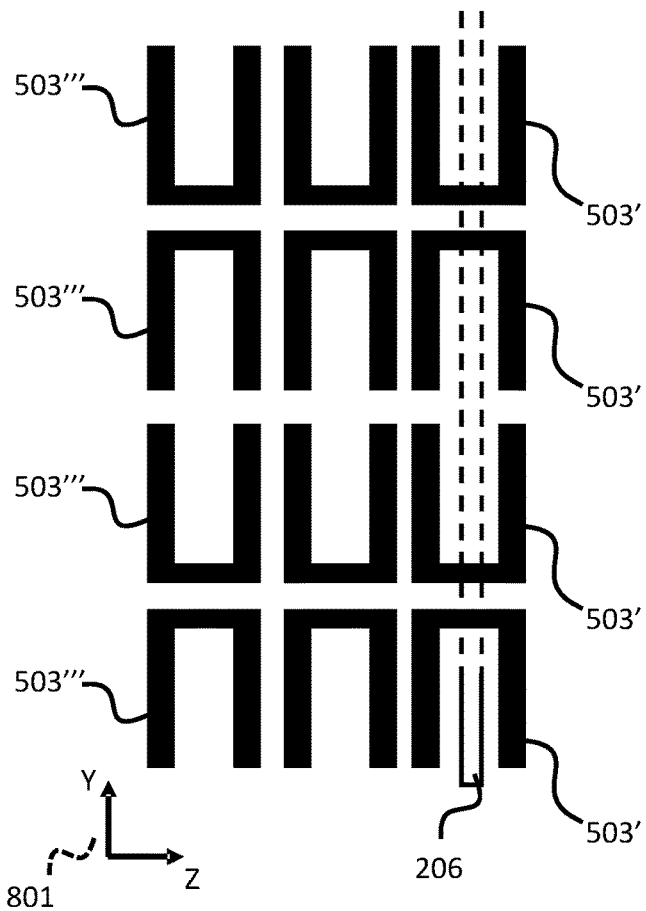

FIGS. 18c and 18d show yet another integration example, where the passive repeater configuration 501 extends outside of the wall. FIG. 18c is a top view and FIG. 18d is a side view of the cross section of the wall 100 at an edge of the window aperture. There is at least one resonating section 503' outside the wall structure. In this case, the clad 206 may be conductive. Yet in another embodiment, if the clad 206 is conductive, some resonating sections 503' may be formed in the clad 206 e.g. as slot radiators (not shown).

Figure 19:
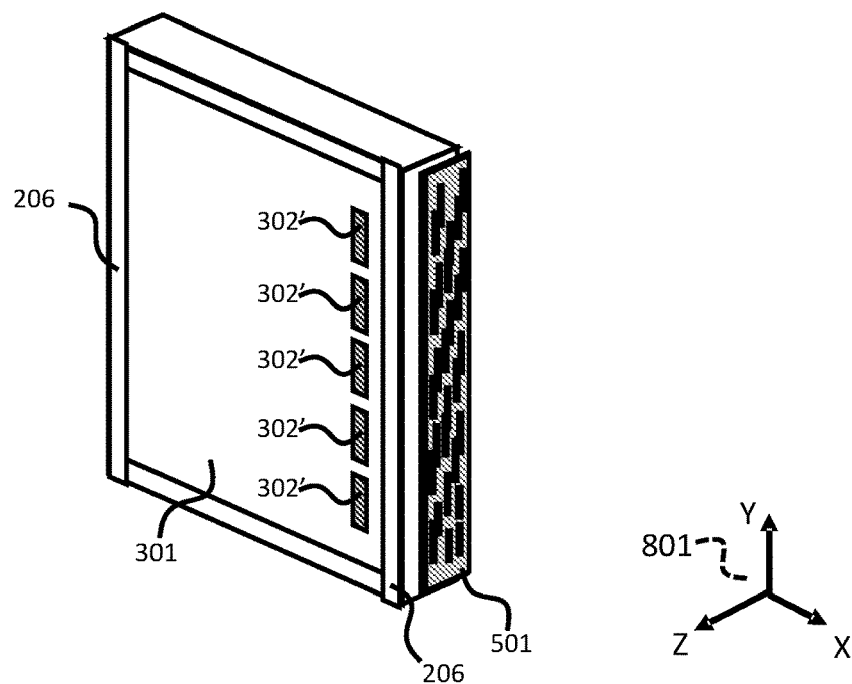
FIG. 19 illustrates an example of forming a passive repeater configuration on a surface of a window class as a group of slot radiators.

FIG. 19 illustrates an example of forming the passive repeater configuration 501 on a surface of a window class 301 as a group of slot radiators 302'. In this case the exterior shell 206 may be made of aluminium clads.

Figure 20:
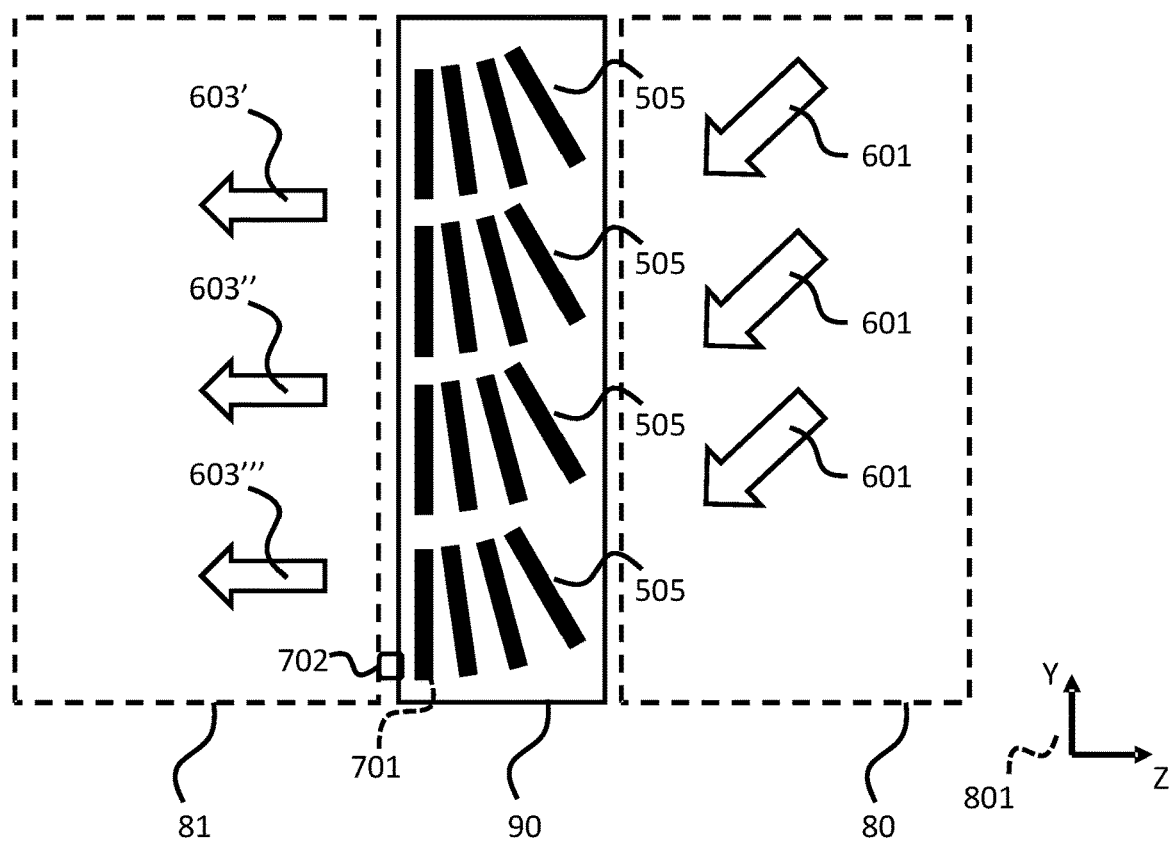
FIG. 20 illustrates an example where one or more subarrays of resonating sections are formed in such a way that the adjacent resonating sections are not parallel.

FIG. 20 illustrates an example where one or more subarrays 505 of resonating sections are formed in such a way that the adjacent resonating sections are not parallel but the distance between two adjacent resonating sections is different at different ends of the adjacent resonating sections. This kind of configuration may be used to form a radiation pattern of at least one side of the passive repeater which is directed upwards or downwards as is illustrated with arrows 601. Hence, the passive repeater may be able to receive signals e.g. from sky better compared to a situation where the radiation pattern were in a horizontal direction. Such a configuration may be useful when receiving signals from satellites, such as signals from satellites of a satellite navigation system like GPS, GLONASS, GALILEO, Beidou, as well as satellite based communication systems such as Iridium, Inmarsat, Globalstar, OneWeb or SpaceX.

Figure 21:
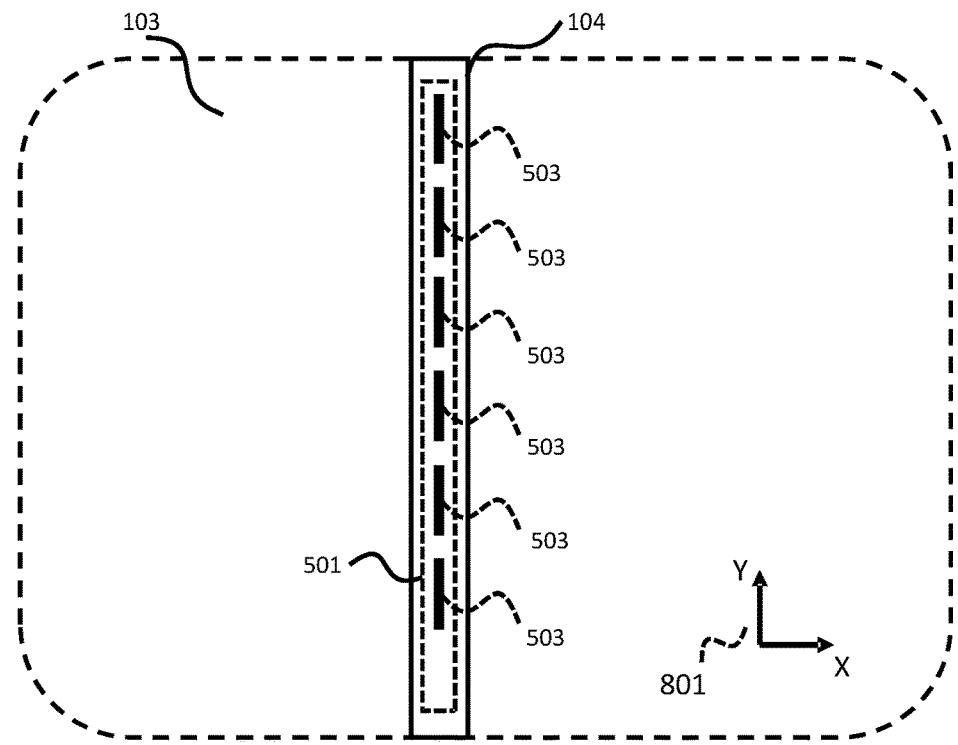
FIG. 21 shows an example where the passive repeater configuration is installed into a seam between two insulation panels.
Figure 22:
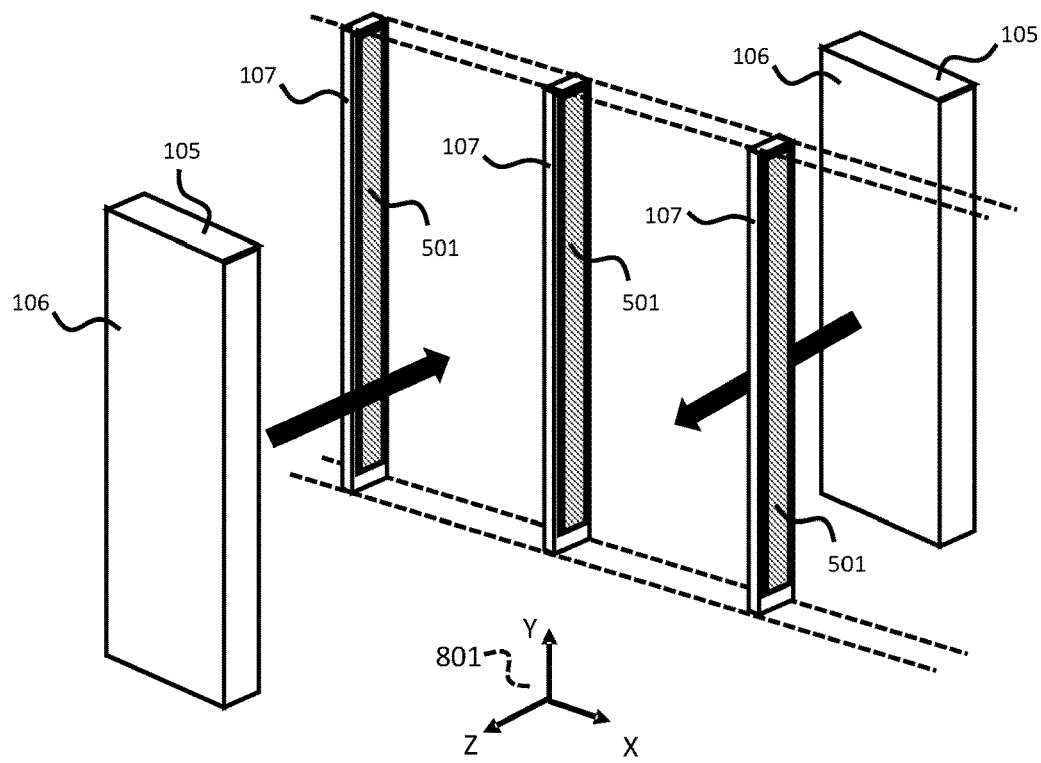
FIG. 22 shows an example where the passive repeater is installed on a surface of a supporting rail of a wall of a building.
Figure 23:
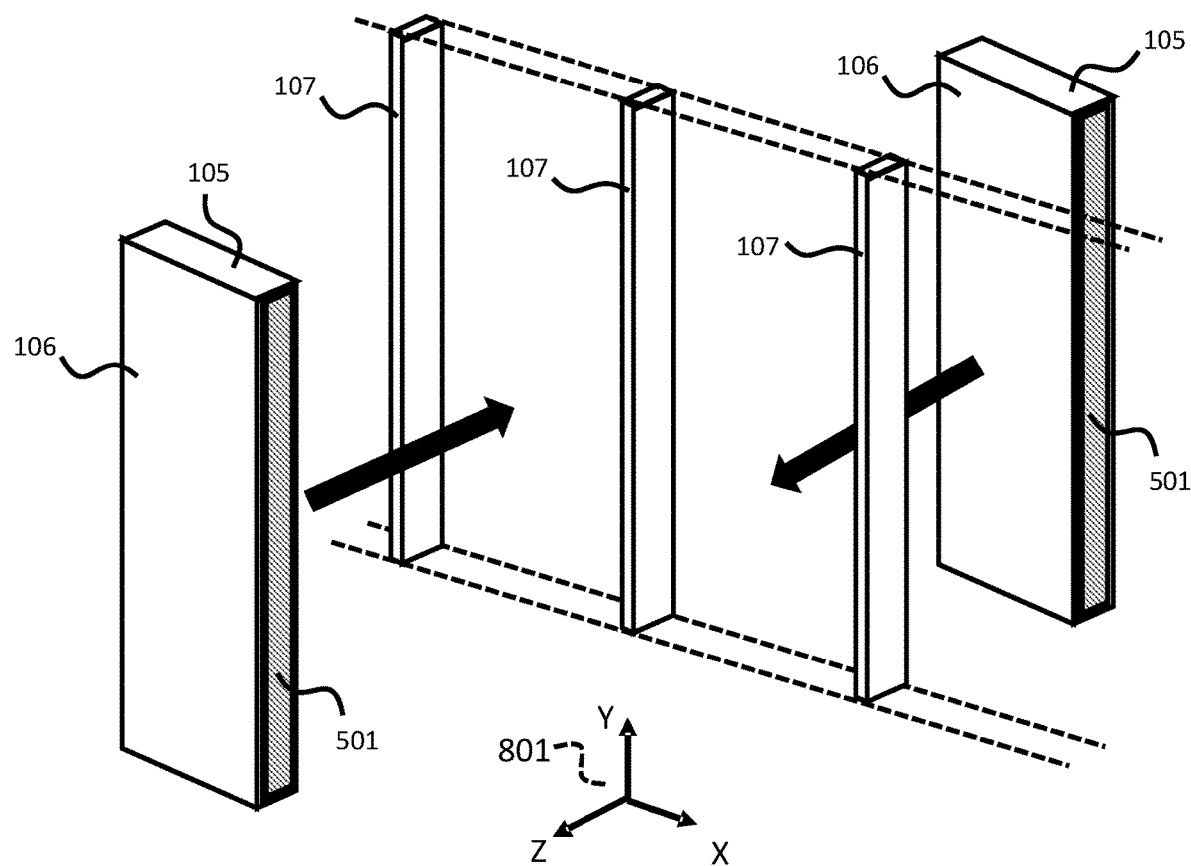
FIG. 23 shows an example where the passive repeater is installed on a surface of an edge of one of the insulation panels of a wall of a building.

FIG. 21 shows an example where the passive repeater configuration 501 is installed into a seam between two insulation panels 103 covered with aluminium. For example, the passive repeater configuration 501 is installed on a surface of a supporting rail of a wall of a building, as is illustrated in FIG. 22, on a surface of an edge of one of the insulation panels 103 of a wall of a building, as is illustrated in FIG. 23, or it may be integrated in a separate insulation panel, which may be assembled in the seam between the two insulation panels 103.

There are many possible ways to manufacture the passive repeater 501. For example, the resonating sections 503 may be installed between wood, plastic and/or glassfiber parts. Another option is to use printing (or other additive manufacturing method) or etching to form desired patterns of conductive material on a substrate. The passive repeater 501 may then be attached on a surface of a construction supply by e.g. using an adhesive or other suitable method. In some embodiments, the passive repeater 501 may be integrated in a construction supply. When the passive repeater 501 is attached on a surface of a construction supply, it may be protected by covering the passive repeater 501 with a plastic sheet, a plank wood, etc., or applying e.g. varnish on the surface of the passive repeater 501.

Figure 24A:
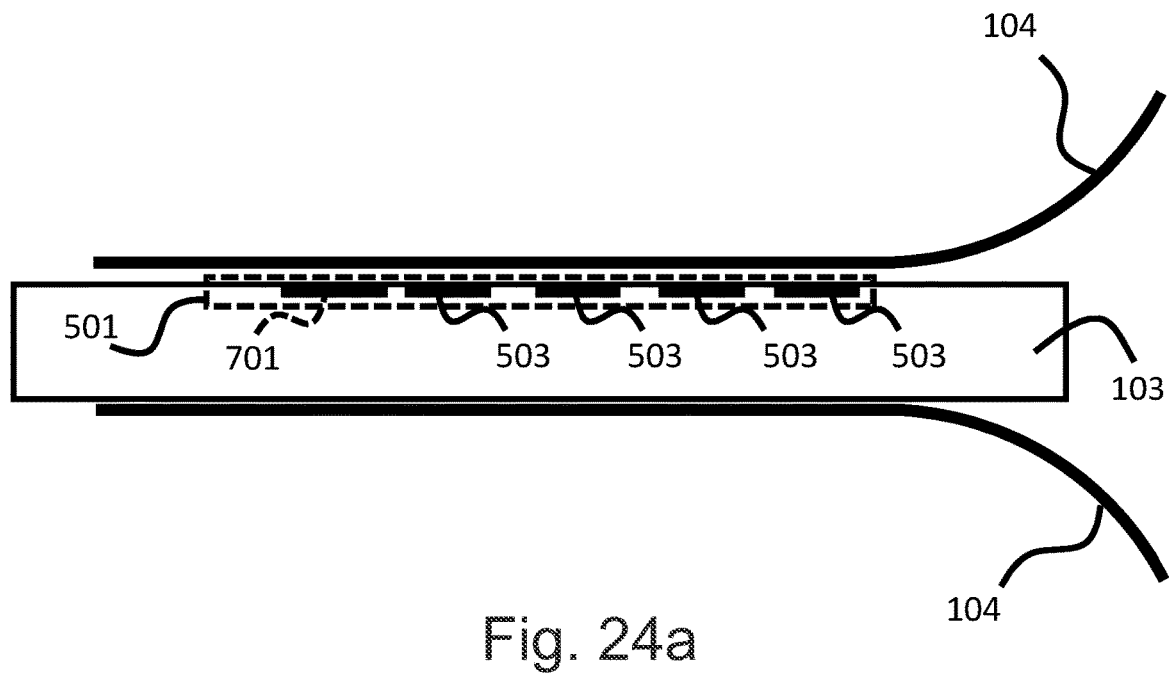
FIG. 24a shows an example where resonating sections of the passive repeater are laminated in a rigid insulation panel.

FIG. 24a illustrate an example in which the resonating sections 503 are laminated in a rigid insulation panel 103. Both surfaces of the insulation panel 103 may be covered by a covering 104 so that the passive repeater 501 is located between one surface of the insulation panel 103 and the covering 104 which covers that surface.

Figure 24B:
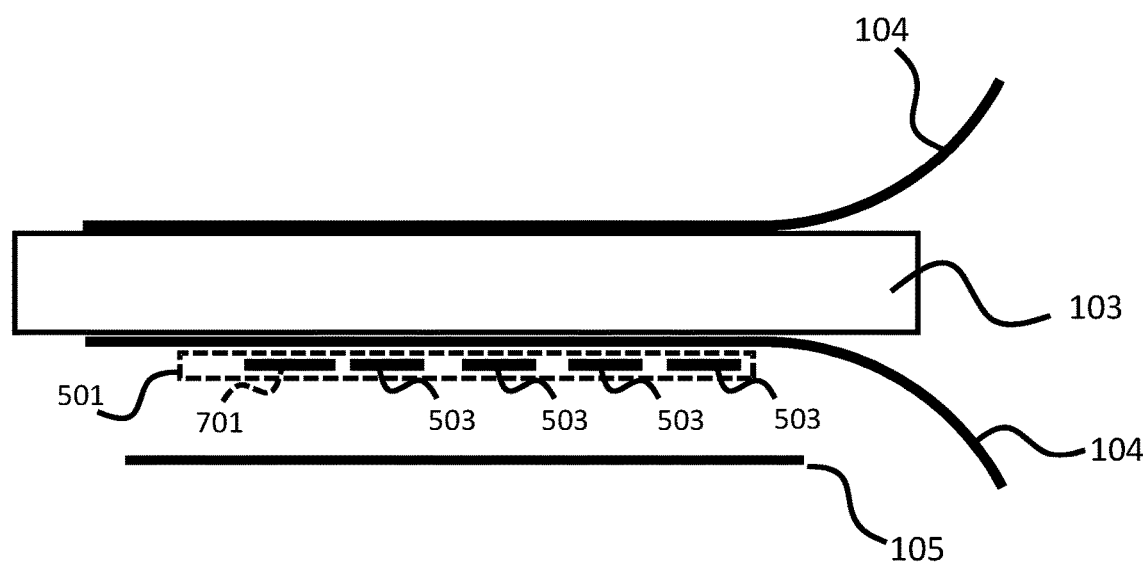
FIG. 24b shows an example where resonating sections of the passive repeater are laminated on a surface of a laminated, rigid insulation panel.

FIG. 24b illustrate an example in which the resonating sections 503 are laminated on a surface of a laminated, rigid insulation panel 103. Both surfaces of the insulation panel 103 are covered by a covering 104 and the passive repeater 501 is located above the covering 104. There may be an additional covering 105 under which the passive repeater 501 is located.

Figure 25A:
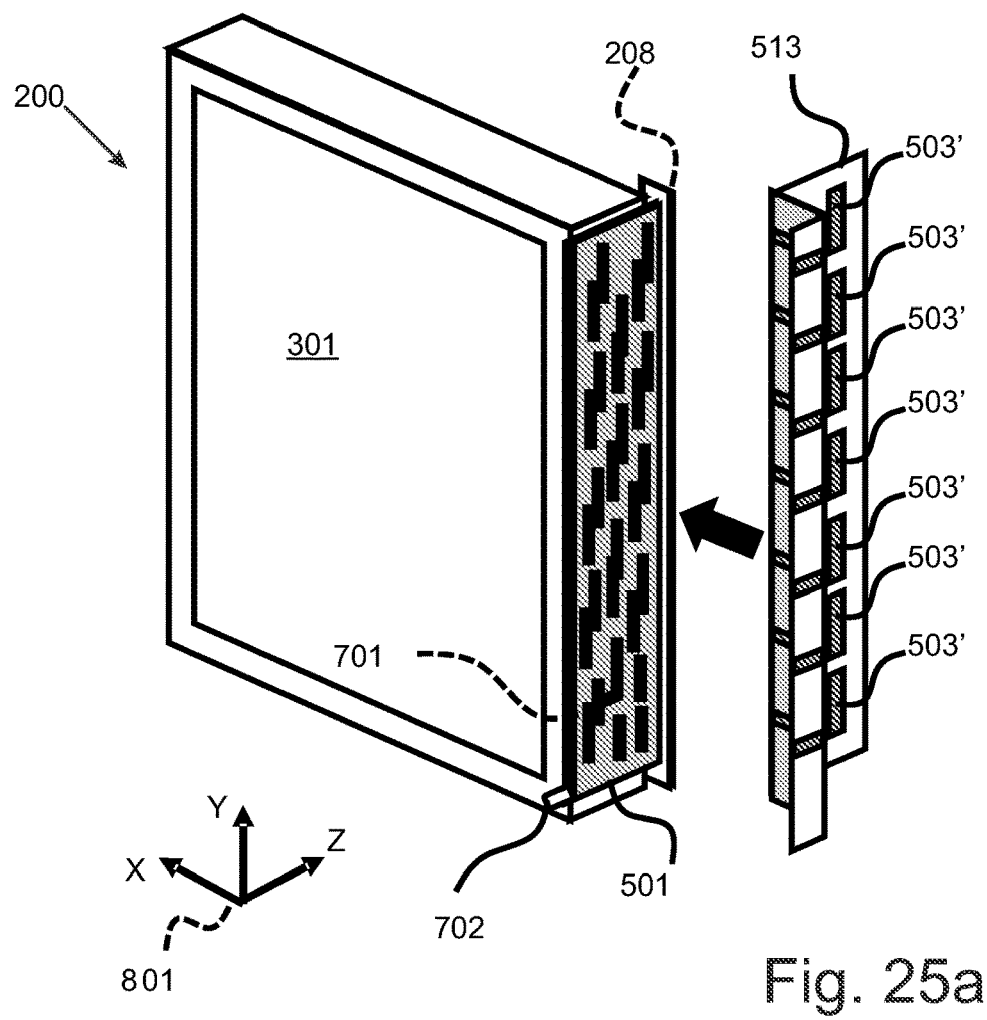
FIGS. 25a and 25b illustrate another example of how to attach the device with a window assembly.
Figure 25B:
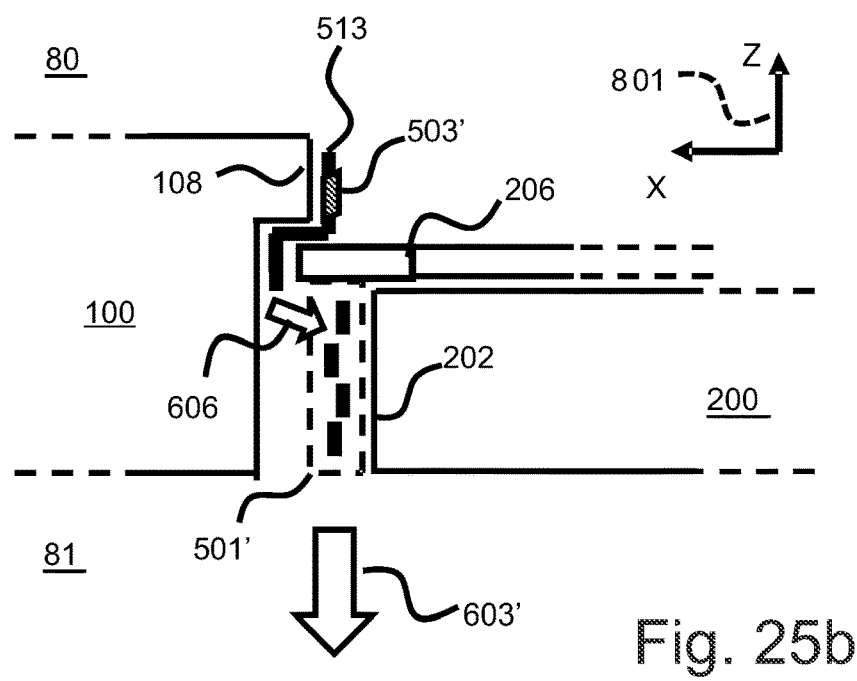

FIGS. 25a and 25b illustrate yet another example of how to attach the device 501 with a window assembly 200. The device 501 is installed on the surface of the outer side of the jamb 202. A protective cover 513 can be added to the structure to provide mechanical protection against abrasion or environmental effects, such as moistness. In this embodiment, the protective cover 513 is electrically conductive or has an electrically conductive coating. The protective cover 513 comprises one or more resonating elements 503' such as slit radiators. These resonating elements 503' may be used to transfer electromagnetically signals between the outer space and the device 501. This kind of protective cover 513 may also improve signal propagation when the exterior shell 206 is made of aluminium or other electrically conducting material.

In accordance with an embodiment, the resonating sections 503 may be formed on a surface of a flexible substrate, such as plastic, which is covered by another layer of flexible material. Hence, the device 501 comprises a first layer as the substrate, a second layer comprising the resonating sections 503, and a third layer as the cover. This kind of device 501 may be formed by using a so called roll-to-roll process (a.k.a. reel-to-reel process or web process), in which the substrate and the cover come from originating roll after which the resonating sections 503 and other possible elements are applied on the substrate, and the cover is inserted on top of the structure to obtain a web of devices 501. Then, the web may be provided to a receiving roll. The devices 501 may be cut away from the web. This kind of device 501 may be attached with a construction supply e.g. by using an adhesive.

Window frame materials can be wood, plastic (PVC, uPVC, vinyl, and other plastic materials), glass fiber, or other composite material. Many windows types are a combination of different materials, such as wood and aluminium, wood and uPVC, uPVC and wood, or glass fiber and wood.

The material used for the resonating sections 503 is preferably a conductive material, such as sheet metal, conductive plastic, or the like. The sheet metal used can be, for example, aluminium or copper sheet. Another possibility is to use a less conductive material or an electrical insulator that is treated to become conductive, for example by providing the material with a conductive coating.

In the following some examples will be provided.

In accordance with a first example, there is provided a device 501 for receiving and re-radiating electromagnetic signals, the device 501 being adapted to be attached with a construction supply 90, characterized in that the device 501 comprises:

an electromagnetically floating group 502 of resonating sections 503 to form a propagation path to guide electromagnetic energy of the electromagnetic signals from one side of the construction supply 90 to another side of the construction supply 90;

wherein the electromagnetically floating group 502 of resonating sections 503 comprises at least a first resonating section 503' and a second resonating section 503" positioned in a near field of the adjacent, first resonating section 503' in the direction of the propagation path.

In accordance with an embodiment of the device 501 the electromagnetically floating group 502 comprises resonating sections 503 in at least two rows in the direction of the propagation path.

In accordance with an embodiment of the device 501 each row comprises two or more resonating sections 503.

In accordance with an embodiment the device 501 comprises at least one re-radiating element 514, which comprises two or more said resonating sections 503.

In accordance with an embodiment of the device 501 the electromagnetically floating group 502 is configured in an assembly with two or more resonating sections 503 forming a queue in the direction perpendicular to the propagation path.

In accordance with an embodiment of the device 501 the electromagnetically floating group 502 is configured in an assembly with resonating sections 503 positioned according to a zig-zag pattern in at least one of the following direction:
  the propagation path;
  perpendicular to the propagation path.

In accordance with an embodiment the device 501 is adapted to be installed in a frame 201 of a window 200.

In accordance with an embodiment of the device 501 at least one resonating section 503 is adapted to extend outside the construction supply 90.

In accordance with an embodiment of the device 501 the resonating sections 503 are electrically conducting.

In accordance with an embodiment of the device 501 the resonating sections 503 has one or more of the following shapes:
  rectangular;
  meandered;
  circular;
  triangular.

In accordance with an embodiment of the device 501 the electromagnetically floating group 502 comprises a first set of resonating sections 503 and a second set of resonating sections 503, wherein the first set of resonating sections 503 is adapted to operate at a first frequency range, and the second set of resonating sections 503 is adapted to operate at a second frequency range.

In accordance with an embodiment the device 501 further comprises an antenna 701 and means 702, 703 for transferring a part of electromagnetic energy via the antenna 701.

In accordance with an embodiment of the device 501 the antenna 701 is adapted to couple electromagnetically with at least one resonating section 503.

In accordance with an embodiment of the device 501 the at least one resonating section 503 is adapted to enhance a radiation pattern of the antenna 701 in at least one direction.

In accordance with an embodiment the device 501 further comprises means 504 for matching impedance of one or more resonating sections for controlling frequency behaviour of the device 501.

In accordance with a second example, there is provided a method for receiving and re-radiating electromagnetic signals by a device 501 attached with a construction supply 90, characterized in that the method comprises:

receiving electromagnetic signals by an electromagnetically floating group 502 of resonating sections 503 forming a propagation path;

using the electromagnetically floating group 502 of resonating sections 503 to guide electromagnetic energy of the electromagnetic signals from one side of the construction supply 90 to another side of the construction supply 90;

wherein electromagnetic energy is transferred by a first resonating section 503' to a second resonating section 503" positioned in a near field of the adjacent, first resonating section 503'.

In accordance with an embodiment of the method the electromagnetically floating group 502 comprises resonating sections 503 in at least two rows in the direction of the propagation path, wherein electromagnetic energy is transferred by each row of resonating sections 503.

In accordance with an embodiment of the method the electromagnetically floating group 502 comprises a first set of resonating sections 503 and a second set of resonating sections 503, wherein the first set of resonating sections 503 is adapted to operate at a first frequency range, and the second set of resonating sections 503 is adapted to operate at a second frequency range, wherein electromagnetic energy at the first frequency range is transferred by the first set of resonating sections 503, and electromagnetic energy at the second frequency range is transferred by the second set of resonating sections 503.

In accordance with an embodiment of the method the device 501 further comprises an antenna 701, wherein a part of electromagnetic energy is transferred via the antenna 701.

In accordance with an embodiment of the method a part of a window operates as an antenna to transfer electromagnetic energy to/from one or more of the resonating sections 503.

In accordance with an embodiment of the method one or more of the following operates as the antenna:
  a metal frame of the window;
  a metal sash of the window;
  an electrically conducting surface of a window panel.

In accordance with a third example there is provided a construction supply comprising the device 501 according to any of the claims 1 to 14.

In accordance with an embodiment the construction supply is a thermal insulation board, wherein the device 501 is laminated in connection with the insulation board.

In accordance with a third example there is provided a repeater system comprising the device 501 according to any of the examples above assembled with a window frame to guide electromagnetic energy to bypass window glazing through a part of the window frame.

The present disclosure is not limited solely to the above-presented embodiments, but it can be modified within the scope of the appended claims.

The invention claimed is:

1. A device for receiving electromagnetic signals from incident electromagnetic radiation and re-radiating electromagnetic signals as emitted electromagnetic radiation, the device being configured to be attached with a construction supply, the device comprising:
   an electromagnetically floating group of resonating electrically conducting sections to form a propagation path to guide electromagnetic energy of the electromagnetic signals from one side of the construction supply to another side of the construction supply through or beside the construction supply;
   wherein the electromagnetically floating group of resonating electrically conducting sections comprises at least a first resonating electrically conducting section configured to interact with the incident electromagnetic radiation and a second resonating electrically conducting section positioned in a near field of the adjacent, first resonating electrically conducting section in the direction of the propagation path.

2. The device according to claim 1, wherein the electromagnetically floating group comprises the resonating electrically conducting sections in at least two rows in the direction of the propagation path.

3. The device according to claim 2 further comprising at least one re-radiating element, which comprises two or more said resonating electrically conducting sections.

4. The device according to claim 3, wherein the electromagnetically floating group comprises a first set of resonating electrically conducting sections and a second set of resonating electrically conducting sections, wherein the first set of resonating electrically conducting sections is configured to operate at a first frequency range, and the second set of resonating electrically conducting sections is configured to operate at a second frequency range.

5. The device according to claim 1 further comprising at least one re-radiating element, which comprises two or more said resonating electrically conducting sections.

6. The device according to claim 5, wherein the electromagnetically floating group comprises a first set of resonating electrically conducting sections and a second set of resonating electrically conducting sections, wherein the first set of resonating electrically conducting sections is configured to operate at a first frequency range, and the second set of resonating electrically conducting sections is configured to operate at a second frequency range.

7. The device according to claim 5 further comprising an antenna and means for transferring a part of electromagnetic energy via the antenna.

8. The device according to claim 1, wherein the electromagnetically floating group is configured in an assembly with two or more resonating electrically conducting sections forming a queue in the direction perpendicular to the propagation path.

9. The device according to claim 1, wherein the electromagnetically floating group comprises a first set of resonating electrically conducting sections and a second set of resonating electrically conducting sections, wherein the first set of resonating electrically conducting sections is configured to operate at a first frequency range, and the second set of resonating electrically conducting sections is configured to operate at a second frequency range.

10. The device according to claim 1 further comprising an antenna and means for transferring a part of electromagnetic energy via the antenna.

11. The device according to claim 10, wherein the antenna is configured to couple electromagnetically with at least one resonating electrically conducting section.

12. The device according to claim 11, wherein the at least one resonating electrically conducting section is configured to enhance a radiation pattern of the antenna in at least one direction.

13. The device according to claim 1 further comprising means for matching impedance of one or more resonating electrically conducting sections for controlling frequency behaviour of the device.

14. A method for receiving electromagnetic signals from incident electromagnetic radiation and re-radiating electromagnetic signals as emitted electromagnetic radiation by a device attached with a construction supply, wherein the method comprises:
   receiving electromagnetic signals by an electromagnetically floating group of resonating electrically conducting sections forming a propagation path;
   using the electromagnetically floating group of resonating electrically conducting sections to guide electromagnetic energy of the electromagnetic signals from one side of the construction supply to another side of the construction supply through or beside the construction supply;
   wherein electromagnetic energy is transferred by a first resonating electrically conducting section interacting with the incident electromagnetic radiation to a second resonating electrically conducting section positioned in a near field of the adjacent, first resonating electrically conducting section in the direction of the propagation path.

15. The method according to claim 14, wherein one or more of the following operates as an antenna:
   a metal frame of a window;
   a metal sash of a window;
   an electrically conducting surface of a window panel.

16. A construction supply comprising a device for receiving electromagnetic signals from incident electromagnetic radiation and re-radiating electromagnetic signals as emitted electromagnetic radiation, the device comprising:
   an electromagnetically floating group of resonating electrically conducting sections to form a propagation path to guide electromagnetic energy of the electromagnetic signals from one side of the construction supply to another side of the construction supply through or beside the construction supply;
   wherein the electromagnetically floating group of resonating electrically conducting sections comprises at least a first resonating electrically conducting section configured to interact with the incident electromagnetic radiation and a second resonating electrically conducting section positioned in a near field of the adjacent, first resonating electrically conducting section in the direction of the propagation path.

17. The construction supply according to claim 16, wherein the electromagnetically floating group comprises the resonating electrically conducting sections in at least two rows in the direction of the propagation path.

18. The construction supply according to claim 17, wherein the device comprises at least one re-radiating element, which comprises two or more said resonating electrically conducting sections.

19. The construction supply according to claim 16, wherein the device comprises at least one re-radiating element, which comprises two or more said resonating electrically conducting sections.

20. The construction supply according to claim 16, wherein the electromagnetically floating group is configured in an assembly with two or more resonating electrically conducting sections forming a queue in the direction perpendicular to the propagation path.

21. The construction supply according to claim 16 further comprising an antenna and means for transferring a part of electromagnetic energy via the antenna.

22. The construction supply according to claim 16, wherein the construction supply is a thermal insulation board, and the device is laminated in connection with the thermal insulation board.

23. A repeater system comprising a device for receiving electromagnetic signals from incident electromagnetic radiation and re-radiating electromagnetic signals as emitted electromagnetic radiation, the device comprising:
  a construction supply;
  an electromagnetically floating group of resonating electrically conducting sections to form a propagation path to guide electromagnetic energy of the electromagnetic signals from one side of the construction supply to another side of the construction supply through or beside the construction supply;
  wherein the electromagnetically floating group of resonating electrically conducting sections comprises at least a first resonating electrically conducting section configured to interact with the incident electromagnetic radiation and a second resonating electrically conducting section positioned in a near field of the adjacent, first resonating electrically conducting section in the direction of the propagation path, further wherein the device is assembled with a window frame to guide electromagnetic energy to bypass window glazing through a part of the window frame.

24. The repeater system according to claim 23 further comprising an antenna and means for transferring a part of electromagnetic energy via the antenna.

25. A construction supply comprising a device for receiving and re-radiating electromagnetic signals, the device comprising:
  an electromagnetically floating group of resonating electrically conducting sections to form a propagation path to guide electromagnetic energy of the electromagnetic signals from one side of the construction supply to another side of the construction supply;
  wherein the electromagnetically floating group of resonating electrically conducting sections comprises at least a first resonating electrically conducting section and a second resonating electrically conducting section positioned in a near field of the adjacent, first resonating electrically conducting section in the direction of the propagation path;
  wherein the construction supply is a thermal insulation board, and the device is laminated in connection with the thermal insulation board.

* * * * *